(12) United States Patent
Fujii et al.

(10) Patent No.: US 8,319,882 B2
(45) Date of Patent: Nov. 27, 2012

(54) IMAGE PICKUP DEVICE AND IMAGE PICKUP ELEMENT INCLUDING PLURALITY OF TYPES OF PIXEL PAIRS

(75) Inventors: Shinichi Fujii, Kanagawa (JP); Yasutoshi Katsuda, Kanagawa (JP); Genta Yagyu, Kanagawa (JP)

(73) Assignee: Sony Corporation (JP)

( * ) Notice: Subject to any disclaimer, the term of this patent is extended or adjusted under 35 U.S.C. 154(b) by 91 days.

(21) Appl. No.: 12/735,639

(22) PCT Filed: Feb. 26, 2009

(86) PCT No.: PCT/JP2009/053517
§ 371 (c)(1),
(2), (4) Date: Aug. 4, 2010

(87) PCT Pub. No.: WO2009/107705
PCT Pub. Date: Sep. 3, 2009

(65) Prior Publication Data
US 2011/0063484 A1    Mar. 17, 2011

(30) Foreign Application Priority Data

Feb. 28, 2008    (JP) ................................ P2008-048360

(51) Int. Cl.
*G03B 27/10*    (2006.01)
*G03B 13/10*    (2006.01)
(52) U.S. Cl. ......... 348/345; 348/343; 348/344; 348/351
(58) Field of Classification Search .......... 348/345–356; 396/104, 128
See application file for complete search history.

(56) References Cited

U.S. PATENT DOCUMENTS

| | | | | |
|---|---|---|---|---|
| 5,202,718 | A  * | 4/1993 | Uchiyama | 396/104 |
| 5,467,163 | A  * | 11/1995 | Uchiyama | 396/128 |
| 5,598,964 | A  * | 2/1997 | Gore et al. | 228/1.1 |
| 5,654,790 | A  * | 8/1997 | Uchiyama | 396/123 |
| 5,682,203 | A  * | 10/1997 | Kato | 348/340 |
| 6,263,164 | B1 * | 7/2001 | Nakahara et al. | 396/104 |
| 6,597,868 | B2 * | 7/2003 | Suda | 396/111 |
| 6,690,049 | B2 * | 2/2004 | Suzuki et al. | 257/294 |
| 6,829,008 | B1 * | 12/2004 | Kondo et al. | 348/302 |
| 7,474,352 | B2 | 1/2009 | Oikawa | |

(Continued)

FOREIGN PATENT DOCUMENTS

JP    2004-191629 A    7/2004

(Continued)

*Primary Examiner* — John Villecco
*Assistant Examiner* — Selam Gebriel
(74) *Attorney, Agent, or Firm* — Lerner, David, Littenberg, Krumholz & Mentlik, LLP

(57) ABSTRACT

A phase-difference detecting image pickup element performs focus detection even if the position of an exit pupil with respect to the image pickup element changes. A pixel pair receives an object light beam transmitted through a pair of portion areas whose areas become the same in an exit pupil at a particular distance from the image pickup element. The pixel pair includes light-intercepting portions that define the pair of portion areas. A different pixel pair whose light-intercepting portions are different so that the areas of the pair of portion areas in the exit pupil the particular distance from the image pickup element are the same. By this, even if the position of the exit pupil is changed by, for example, a lens replacement, focus detection can be performed by a phase-difference detection method by selecting a pixel pair in accordance with the position of the exit pupil.

3 Claims, 14 Drawing Sheets

U.S. PATENT DOCUMENTS

| | | | |
|---|---|---|---|
| 7,745,772 B2* | 6/2010 | Utagawa | 250/208.1 |
| 7,873,267 B2* | 1/2011 | Kusaka | 396/104 |
| 8,059,954 B2* | 11/2011 | Moon | 396/104 |
| 2001/0026322 A1* | 10/2001 | Takahashi et al. | 348/340 |
| 2002/0121652 A1* | 9/2002 | Yamasaki | 257/222 |
| 2007/0154200 A1* | 7/2007 | Utagawa et al. | 396/111 |
| 2007/0206940 A1* | 9/2007 | Kusaka | 396/128 |
| 2007/0237511 A1 | 10/2007 | Kusaka | |

FOREIGN PATENT DOCUMENTS

| | | |
|---|---|---|
| JP | 2007-155929 A | 6/2007 |
| JP | 2007-155929 A | 6/2007 |
| JP | 2007-189312 A | 7/2007 |
| JP | 2007-189312 A | 7/2007 |
| JP | 2007-279312 A | 10/2007 |
| JP | 2007-279312 A | 10/2007 |

* cited by examiner

IMAGE PICKUP DEVICE AND IMAGE PICKUP ELEMENT INCLUDING PLURALITY OF TYPES OF PIXEL PAIRS

CROSS-REFERENCE TO RELATED APPLICATIONS

The present application is a national phase entry under 35 U.S.C. §371 of International Application No. PCT/JP2009/053517 filed Feb. 26, 2009, published on Sep. 3, 2009 as WO 2009/107705 A1, which claims priority from Japanese Patent Application No. JP 2008-048360 filed in the Japanese Patent Office on Feb. 28, 2008.

BACKGROUND OF THE INVENTION

1. Technical Field

The present invention relates to a technology of an image pickup element capable of receiving an object light beam transmitted through a shooting optical system.

2. Background Art

In an image pickup device such as a single-reflex digital camera of a lens-replacement type, the use of an image pickup element (may hereunder be also referred to as a phase-difference detecting image pickup element) is proposed. The image pickup element includes a plurality of pairs of pixels (hereunder may also be referred to as "AF pixel pairs") and is capable of performing focus detection by a phase difference detection method. Each AF pixel pair generates a corresponding pixel signal by receiving object light beams transmitted through a pair of portion areas (such as a left pupil portion/a right pupil portion) in an exit pupil of an interchangeable lens (shooting optical system).

In the phase-difference detecting image pickup element, at each AF pixel pair separated from the center thereof, the object light beams used in the focus detection may be limited due to vignetting of the shooting optical system. In such a case, an imbalance may occur in the pixel signals generated at the AF pixel pairs. As disclosed in, for example, Japanese Unexamined Patent Application Publication No. 2004-191629, this problem can be mitigated by reducing the imbalance as a result of performing a corrective calculation on the pixel signals generated at the AF pixel pairs on the basis of a ratio between a pupil width and a shift amount with respect to an optical axis of the pupil limited by the vignetting.

However, in the technology discussed in the aforementioned Japanese Unexamined Patent Application Publication No. 2004-191629, if the imbalance in the pixel signals generated at the AF pixel pairs becomes excessive, the imbalance cannot be completely corrected even if the corrective calculation is performed, thereby preventing the imbalance from being properly corrected. In particular, even when, for example, an interchangeable lens in which the position of an exit pupil with respect to the image pickup element is considerably different from an assumed position is mounted, the imbalance in the pixel signals generated at the AF pixel pairs is excessive. Even in such a case, it is difficult to eliminate the imbalance by performing the corrective calculation described in the aforementioned Japanese Unexamined Patent Application Publication No. 2004-191629, and to precisely detect the focus.

The present invention is achieved in view of the aforementioned problems, and has as its object the provision of a technology of a phase-difference detecting image pickup element that can precisely perform focus detection even if the position of an exit pupil with respect to the image pickup element changes.

SUMMARY OF THE INVENTION

A first aspect of the present invention provides an image pickup device characterized in comprising (a) a shooting optical system and (b) an image pickup element that receives an object light beam transmitted through the image pickup optical system, wherein the image pickup element includes a group of pixel pairs that receive the object light beam transmitted through a first portion area and a second portion area inclined in opposite directions in an exit pupil of the shooting optical system, wherein the pixel pairs include first and second pixels, each first pixel including a light-intercepting portion where a light-transmitting portion defining the first portion area in the exit pupil is provided, each second pixel including a light-intercepting portion where a light-transmitting portion defining the second portion area in the exit pupil is provided, and wherein the group of pixel pairs includes a plurality of types of pixel pairs whose dispositions of the light-transmitting portions in the light-intercepting portions differ, and the plurality of types of pixel pairs are such that positions of the exit pupil with respect to the image pickup element, where the area of the first portion area and the area of the second portion area become equal to each other, differ from each other.

A second aspect of the present invention provides an image pickup element capable of receiving an object light beam transmitted through a shooting optical system. The image pickup element comprises a group of pixel pairs that receive the object light beam transmitted through a first portion area and a second portion area inclined in opposite directions in an exit pupil of the shooting optical system, wherein the pixel pairs include first and second pixels, each first pixel including a light-intercepting portion where a light-transmitting portion defining the first portion area in the exit pupil is provided, each second pixel including a light-intercepting portion where a light-transmitting portion defining the second portion area in the exit pupil is provided, and wherein the group of pixel pairs includes a plurality of types of pixel pairs whose dispositions of the light-transmitting portions in the light-intercepting portions differ, and the plurality of types of pixel pairs are such that positions of the exit pupil with respect to the image pickup element, where the area of the first portion area and the area of the second portion area become equal to each other, differ from each other.

According to the present invention, the image pickup element comprises a group of pixel pairs that receive the object light beam transmitted through the first portion area and the second portion area inclined in opposite directions in the exit pupil of the shooting optical system, wherein the pixel pairs include first and second pixels, each first pixel including a light-intercepting portion where a light-transmitting portion defining the first portion area in the exit pupil is provided, each second pixel including a light-intercepting portion where a light-transmitting portion defining the second portion area in the exit pupil is provided, and wherein the group of pixel pairs includes a plurality of types of pixel pairs whose dispositions of the light-transmitting portions in the light-intercepting portions differ, and the plurality of types of pixel pairs are such that positions of the exit pupil with respect to the image pickup element, where the area of the first portion area and the area of the second portion area become equal to each other, differ from each other. As a result, even if the position of the exit pupil with respect to the image pickup element is changed by, for example, replacement of a lens, a pixel pair that is in accordance with the position of the exit pupil can be selected from the plurality of types of pixels pairs, so that focus detection can be precisely performed by a phase difference detection method.

DETAILED DESCRIPTION

BEST MODES FOR CARRYING OUT THE INVENTION

<Structure of Main Portions of Image Pickup Device>

Figure 1:
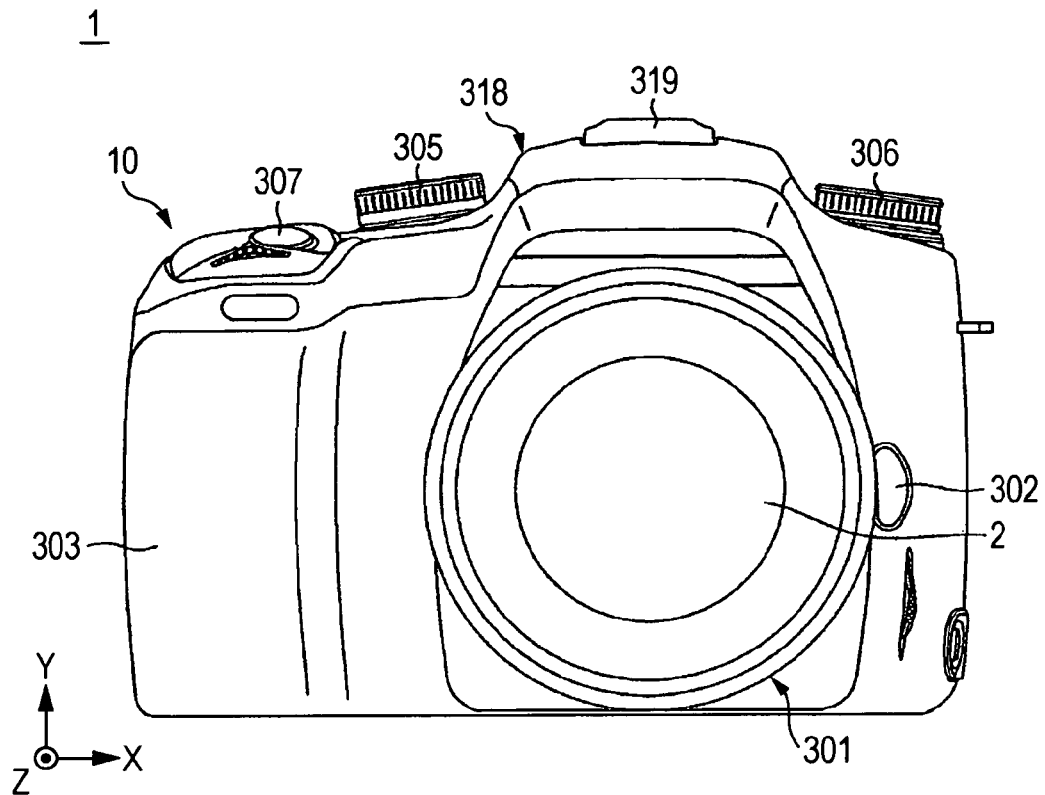
FIG. 1 shows an external structure of an image pickup device 1 according to an embodiment of the present invention.
Figure 2:
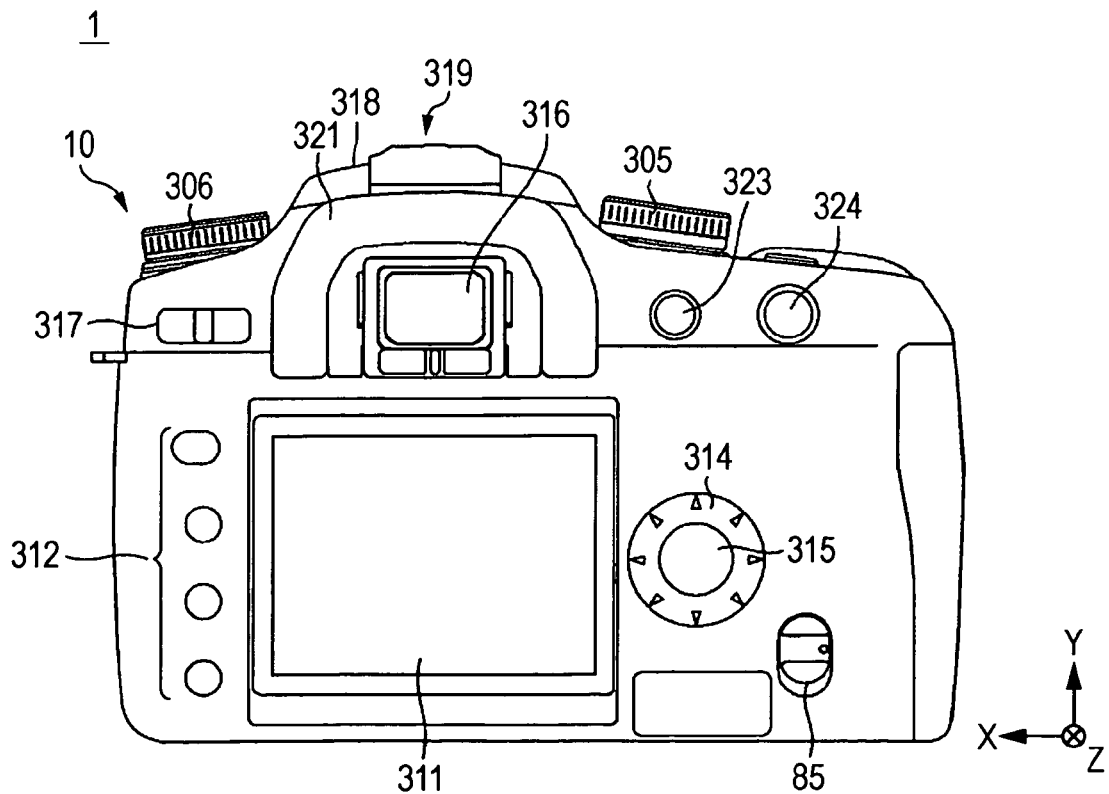
FIG. 2 shows an external structure of the image pickup device 1.

FIGS. 1 and 2 show external structures of an image pickup device 1 according to an embodiment of the present invention. Here, FIGS. 1 and 2 are, respectively, a front view and a rear view.

The image pickup device 1 is formed as, for example, a single-reflex digital still camera, and includes a camera body 10 and an interchangeable lens 2 serving as a shooting lens that is removable from the camera body 10.

In FIG. 1, the front side of the camera body 10 is provided with a mount section 301, a lens interchanging button 302, a grip section 303, a mode setting dial 305, a control-value setting dial 306, and a shutter button 307. The mount section 301 has the interchangeable lens 2 mounted thereto and is provided at substantially the center of the front surface. The lens interchanging button 302 is disposed on the right side of the mount section 301. The grip section 303 can be gripped. The mode setting dial 305 is disposed at the upper left portion of the front surface. The control-value setting dial 306 is disposed at the upper right portion of the front surface. The shutter button 307 is disposed at the upper surface of the grip section 303.

In addition, in FIG. 2, the back side of the camera body 10 is provided with a LCD (Liquid Crystal Display) 311, a setting button group 312, an arrow key 314, and a pushbutton 315. The setting button group 312 is disposed on the left of the LCD 311. The arrow key 314 is disposed on the right of the LCD 311. The pushbutton 315 is disposed in the center of the arrow key 314. The back side of the camera body 10 is also provided with an EVF (Electronic View Finder) 316, an eye cup 321, a main switch 317, an exposure correction button 323 and an AE lock button 324, and a flash section 318 and a connection terminal section 319. The EVF 316 is disposed above the LCD 311. The eye cup 321 surrounds the EVF 316. The main switch 317 is disposed on the left of the EVF 316. The exposure correction button 323 and the AE lock button 324 are disposed on the right of the EVF 316. The flash section 318 and the connection terminal section 319 are disposed above the EVF 316.

The mount section 301 is provided with a connector Ec (see FIG. 4) for electrical connection with the mounted interchangeable lens 2 and with a coupler 75 (see FIG. 4) for mechanical coupling with the mounted interchangeable lens 2.

The lens interchanging button 302 is a button that is pressed when removing the interchangeable lens 2 mounted to the mount section 301.

The grip section 303 is a portion of the image pickup device 1 that a user grips when performing shooting, and has an uneven surface in accordance with the shapes of the fingers for increasing fittability. Further, a battery accommodating chamber and a card accommodating chamber (not shown) are provided in the grip section 303. The battery accommodating chamber accommodates a battery 69B (see FIG. 4) as a power supply of the camera. The card accommodating chamber removably accommodates a memory card 67 (see FIG. 4) for recording image data of a shooting image. Further, the grip section 303 may be provided with a grip sensor for detecting whether or not the user has gripped the grip section 303.

The mode setting dial 305 and the control-value setting dial 306 are substantially disc-shaped members that are rotatable in a plane substantially parallel to the top surface of the camera body 10. The mode setting dial 305 is provided for alternatively selecting functions or modes provided in the image pickup device 1, such as an automatic exposure (AE) control mode or an automatic focus (AF; autofocus) control mode, or various shooting modes (such as a still image shooting mode for shooting one still image or a continuous shooting mode for performing continuous shooting), or a reproduction mode for reproducing a recorded image. In contrast, the control-value setting dial 306 is provided for setting control values for the various functions of the image pickup device 1.

The shutter button 307 is a pushbutton that can be operated so as to be partially pressed (in a partially pressed state) and that can be operated so as to be in a completely pressed state reached by further pressing the shutter button 307. When the shutter button 307 is partially pressed in the still image shooting mode, preparation operations for shooting a still image of an object (such as setting an exposure control value or detecting a focus) are executed. When the shutter button 307 is completely pressed, shooting operations (including a series of operations in which an image pickup element 101 (see FIG. 3) is exposed, a predetermined image processing operation is performed on an image signal obtained by the exposure, and the image signal is recorded on, for example, the memory card) are executed.

The LCD 311 includes a color liquid crystal panel capable of displaying an image. The LCD 311, for example, reproduces and displays a recorded image or displays an image picked up by the image pickup element 101 (see FIG. 3), and displays a function or mode setting screen of the image pickup device 1. Further, instead of the LCD 311, an organic EL or a plasma display device may also be used.

The setting button group 312 includes buttons for performing the various functions of the image pickup device 1. The setting button group 312 includes, for example, a selection confirmation switch for confirming selected content at a menu screen displayed on the LCD 311, a selection cancel switch, a menu display switch for switching the content of the menu screen, a display on/off switch, and a display enlargement switch.

The arrow key 314 includes an annular member provided with a plurality of pressing portions (triangular portions in FIG. 2) disposed at constant intervals in a circumferential direction, and is formed so that pressing of the pressing portions by contacts (switches) provided in correspondence with the respective pressing portions is detected. In addition, the pushbutton 315 is disposed at the center of the arrow key 314. The arrow key 314 and the push button 315 are provided for inputting instructions of, for example, setting shooting conditions (such as a diaphragm stop value, shutter speed, existence/absence of flash light generation), advancing frames of recorded images reproduced by, for example, the LCD 311, and changing shooting magnification (moving a zoom lens 212 (see FIG. 4) in a wide-angle direction or a telephoto direction).

Figure 3:
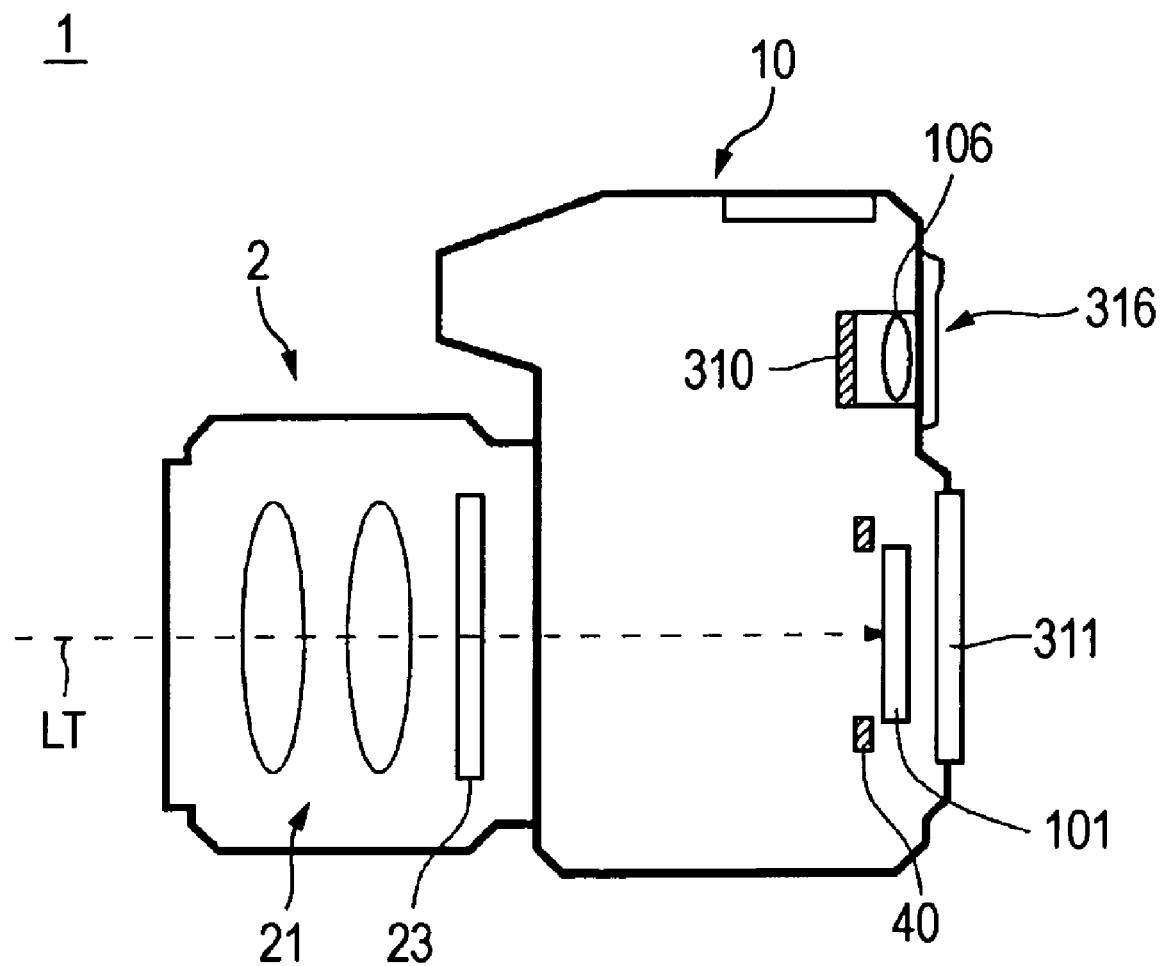
FIG. 3 is a vertical sectional view of the image pickup device 1.

The EVF 316 includes a liquid crystal panel 310 (see FIG. 3), and, for example, reproduces and displays a recorded image or displays an image picked up by the image pickup element 101 (see FIG. 3). At the EVF 316 and the LCD 311, the user can visually recognize an object that is actually shot by the image pickup element 101 by performing a live view (preview) display in which the object is dynamically displayed on the basis of image signals successively generated by the image pickup element 101 prior to the actual shooting (shooting for image recording).

The main switch 317 is a two-contact slide switch that slides towards the left and right. When the main switch 317 is set to the left, a power supply of the image pickup device 1 is turned on, whereas, when it is set to the right, the power supply of the image pickup device 1 is turned off.

The flash section 318 is formed as a pop-up type built-in flash section. On the other hand, when, for example, an external flash section is to be mounted to the camera body 10, it is connected by the connection terminal section 319.

The eye cup 321 is a C-shaped light-intercepting member having light-intercepting properties and restricting entry of external light to the EVF 316.

The exposure correction button 323 is a button for manually adjusting an exposure value (diaphragm stop value or shutter speed). The AE lock button 324 is a button for fixing the exposure.

The interchangeable lens 2 functions as a lens window that takes in light (an optical image) from an object, and as a shooting optical system for guiding the object light to the image pickup element 101 disposed in the camera body 10. By pressing the aforementioned lens interchanging button 302, the interchangeable lens 2 can be removed from the camera body 10.

Figure 4:
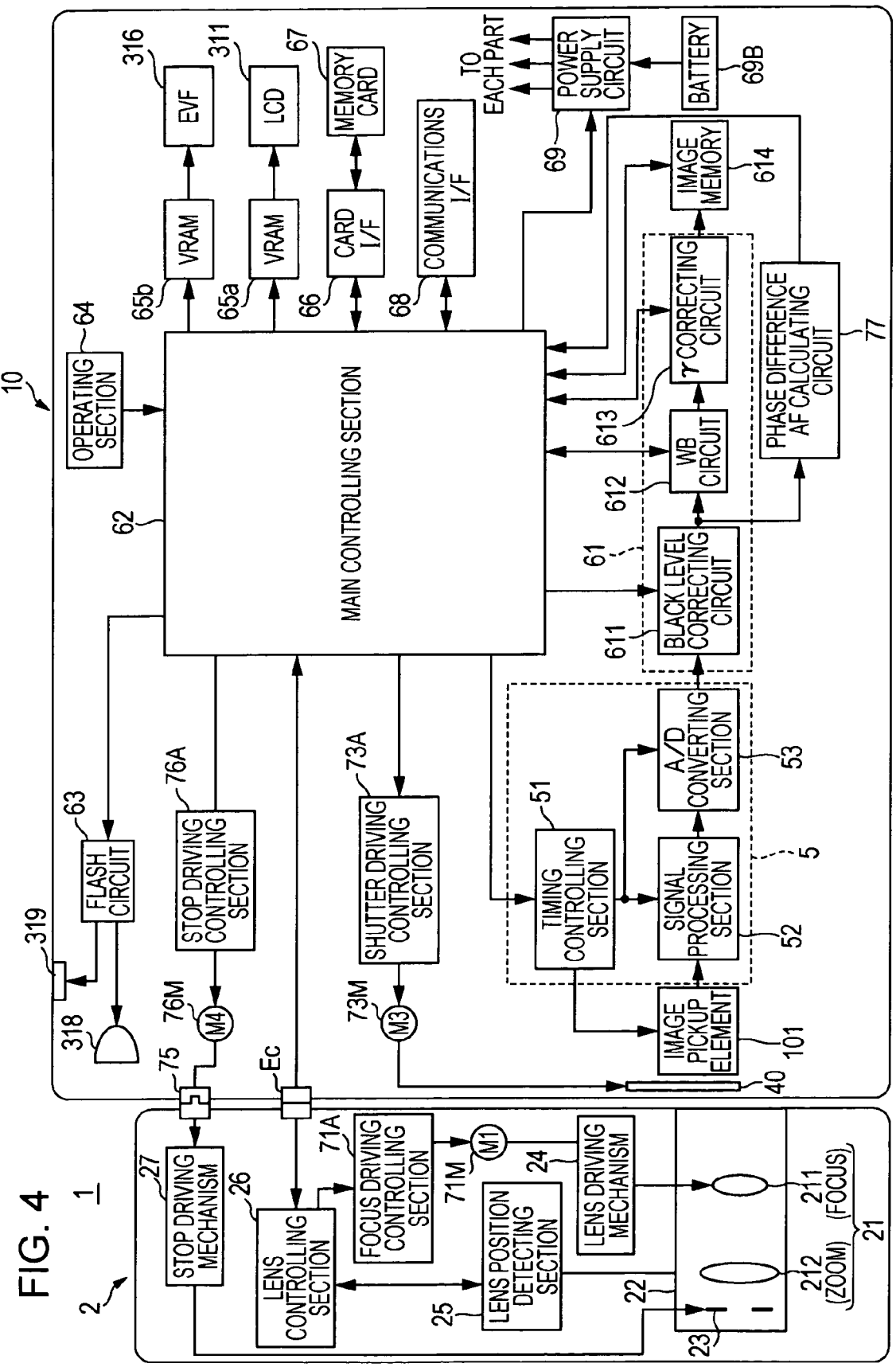
FIG. 4 is a block diagram of an electrical structure of the image pickup device 1.

The interchangeable lens 2 is provided with a lens group 21 including a plurality of lenses disposed in series along an optical axis LT (see FIG. 4). The lens group 21 includes a focus lens 211 for focusing (see FIG. 4) and a zoom lens 212 for changing magnification (see FIG. 4). By driving the focus lens 211 and the zoom lens 212 in the direction of the optical axis LT (see FIG. 3), focusing is performed and magnification is changed. In addition, an operating ring that can be rotated around the outer peripheral surface of a barrel is provided at a suitable location of the outer periphery of the interchangeable lens 2. By manual or automatic operation, the zoom lens 212 is moved in accordance with the direction and the amount of rotation of the operating ring, so that a zoom magnification (shooting magnification) is set in accordance with the position of its destination.

<Internal Structure of Image Pickup Device 1>

Next, the internal structure of the image pickup device 1 will be described. FIG. 3 is a vertical sectional view of the image pickup device 1. As shown in FIG. 3, the image pickup element 101, the EVF 316, etc., are provided in the camera body 10.

The image pickup element 101 is disposed perpendicularly to the optical axis LT of the lens group of the interchangeable lens 2 mounted to the camera body 10. As the image pickup element 101, a CMOS color area sensor (that is, a CMOS image pickup element) is used. In the CMOS image pickup element, for example, a plurality of pixels including photodiodes are two-dimensionally disposed in a matrix. The image pickup element 101 generates analog electrical signals (image signals) of corresponding color components, R (red), G (green), and B (blue), of object light beams received through the interchangeable lens 2, and outputs the image signals of the corresponding colors R, G, and B. The structure of the image pickup element 101 will be described in detail below.

A shutter unit 40 is disposed in front of the image pickup element 101 along the optical axis. The shutter unit 40 is formed as a mechanical focal plane shutter that includes a vertically moving curtain member and that opens and closes an optical path of the object light guided to the image pickup element 101 along the optical axis LT by an opening and a closing operation of the curtain member. Further, the shutter unit 40 can be omitted when the image pickup element 101 is one that allows use of a complete electronic shutter.

The EVF 316 includes the liquid crystal panel 310 and an eyepiece 106. The liquid crystal panel 310 is formed as, for example, a color liquid crystal panel capable of displaying an image, and can display an image picked up by the image pickup element 101. The eyepiece 106 guides an object image displayed on the liquid crystal panel 310 to the outer side of the EVF 316. By virtue of such a structure of the EVF 316, a user can see an object shot with the image pickup element 101.

<Electrical Structure of Image Pickup Device 1>

FIG. 4 is a block diagram of an electrical structure of the image pickup device 1. For example, members corresponding to those shown in FIGS. 1 to 3 are given the same reference numerals. For convenience of explanation, first, an electrical structure of the interchangeable lens 2 will be described.

In addition to the lens group 21 of the aforementioned shooting optical system, the interchangeable lens 2 is provided with a lens driving mechanism 24, a lens position detecting section 25, a lens controlling section 26, and a stop driving mechanism 27.

In the lens group 21, the focus lens 211 and the zoom lens 212, and a stop 23 for adjusting the amount of light that is incident upon the image pickup element 101 provided in the camera body 10 are held along the optical axis LT (see FIG. 3) in the barrel. The lens group 21 takes in an optical image of an object, and focuses it on the image pickup element 101. In AF control, focusing is performed by driving the focus lens 211 by an AF actuator 71M, disposed in the interchangeable lens 2, in the direction of the optical axis LT.

On the basis of an AF control signal applied from a main controlling section 62 through the lens controlling section 26, a focus driving controlling section 71A generates a driving control signal to the AF actuator 71M required for moving the focus lens 211 to its focus position. The AF actuator 71M is formed by, for example, a stepping motor, and applies lens driving power to the lens driving mechanism 24.

The lens driving mechanism 24 includes, for example, a helicoid and a gear (not shown) that rotates the helicoid. The lens driving mechanism 24 receives the driving power from the AF actuator 71M, and drives, for example, the focus lens 211 in a direction parallel to the optical axis LT. Further, the direction and amount of movement of the focus lens 211 are in accordance with the direction of rotation and the number of rotations of the AF actuator 71M, respectively.

The lens position detecting section 25 includes an encode plate and an encoder brush, and detects the amount of movement of the lens group 21 when focusing the lens group 21. In the encode plate, a plurality of code patterns are formed at a predetermined pitch in the direction of the optical axis LT within a range of movement of the lens group 21. The encoder brush moves together with a lens while sliding along and contacting the encode plate. Further, the position of the lens detected by the lens position detecting section 25 is output as, for example, the number of pulses.

The lens controlling section 26 includes, for example, a microcomputer having a memory such as ROM, which stores, for example, a control program, or a flash memory, which stores data regarding condition information. Information regarding the position of the exit pupil of the interchangeable lens 2 (described later) is stored in ROM in the lens controlling section 26.

The lens controlling section 26 has a communication function for communicating with the main controlling section 62 in the camera body 10 through the connector Ec. This makes it possible to send, for example, condition information data, such as the focal length, the exit pupil position, the diaphragm stop value, the focus distance, and the light quantity of a peripheral area of the lens group 21, and information of the position of the focus lens 211, detected by the lens position detecting section 25, to the main controlling section 62. In addition, this makes it possible to receive, for example, data of a driving amount of the focus lens 211 from the main controlling section 62.

The stop driving mechanism 27 receives driving power from a stop driving actuator 76M through the coupler 75, and changes the stop diameter of the stop 23.

Next, an electrical structure of the camera body 10 will be described. In addition to the previously described image pickup element 101, the shutter unit 40, etc., the camera body 10 includes an AFE (analog front end) 5, an image processing section 61, an image memory 614, the main controlling section 62, a flash circuit 63, an operating section 64, VRAM 65 (65a, 65b), a card interface (I/F) 66, the memory card 67, a communications interface (I/F) 68, a power supply circuit 69, the battery 69B, a shutter driving controlling section 73A and a shutter driving actuator 73M, a stop driving controlling section 76A, and the stop driving actuator 76M.

The image pickup element 101 is formed by a CMOS color area sensor as mentioned above. A timing controlling circuit 51 (described later) controls image pickup operations such as reading out a pixel signal, selecting an output of each pixel of the image pickup element 101, and starting (and ending) an exposure operation of the image pickup element 101.

The AFE 5 applies a timing pulse that causes the image pickup element 101 to carry out a predetermined operation, performs a predetermined signal processing operation on image signals output from the image pickup element 101 (that is, on an analog signal group received at each of the pixels of the CMOS area sensor), converts the image signals into digital signals, and outputs the digital signals to the image processing section 61. The AFE 5 includes, for example, the timing controlling circuit 51, a signal processing section 52, and an A/D converting section 53.

On the basis of a reference clock output from the main controlling section 62, the timing controlling circuit 51 generates predetermined timing pulses (that cause, for example, a vertical scanning pulse $\phi Vn$, a horizontal scanning pulse $\phi Vm$, and a reset signal $\phi Vr$ to be generated), outputs the predetermined timing pulses to the image pickup element 101, and controls the image pickup operations of the image pickup element 101. In addition, by outputting the predetermined timing pulses to the signal processing section 52 and the A/D converting section 53, the operations of the signal processing section 52 and the A/D converting section 53 are controlled.

The signal processing section 52 performs a predetermined analog signal processing operation on the analog image signals output from the image pickup element 101. The signal processing section 52 includes, for example, a CDS (correlated double sampling) circuit, an auto gain control (AGC) circuit, and a clamp circuit. On the basis of the timing pulses output from the timing controlling circuit 51, the A/D converting section 53 converts the analog R, G, and B image signals output from the signal processing section 52 into digital image signals of a plurality of bits (such as 12 bits).

The image processing section 61 performs a predetermined signal processing operation on image data output from the AFE 5, and forms an image file. The image processing section 61 includes, for example, a black level correcting circuit 611, a white balance controlling circuit 612, and a gamma correcting circuit 613. Further, the image data taken in by the image processing section 61 is written to the image memory 614 once in synchronism with the reading out of the image pickup element 101. Then, the image data written to the image memory 614 is accessed, so that an operation is carried out in each block of the image processing section 61.

The black level correcting circuit 611 corrects a black level of each of the R, G, and B digital image signals subjected to A/D conversion by the A/D converting section 53 into a reference black level.

On the basis of a white standard corresponding to a light source, the white balance controlling circuit 612 performs level conversion (white balance (WB) adjustment) on the digital signals of the corresponding R (red), G (green), and B (blue) color components. That is, on the basis of WB adjustment data applied from the main controlling section 62, the white balance controlling circuit 612 specifies a portion that is presumed to be actually white from, for example, color saturation data and brightness of a shooting object; determines the average of the R, G, and B color components of this portion; determines a G/R ratio and a G/B ratio; and corrects these levels as correction gain of R and B.

The gamma correcting circuit 613 corrects gradation characteristics of the image data subjected to the WB adjustment. More specifically, the gamma correcting circuit 613 performs nonlinear conversion using a gamma correction table, in which an image data level is previously set for each color component, and an offset adjustment.

In a shooting mode, the image memory 614 is a memory used as a working area that temporarily stores the image data output from the image processing section 61 and that is used for carrying out a predetermined operation on the image data by the main controlling section 62. In addition, in a reproduction mode, the image memory 614 temporarily stores the image data read out from the memory card 67.

The main controlling section 62 includes, for example, a microcomputer in which a storage section such as ROM, which stores a control program, or RAM, which temporarily stores data, is built in, and controls the operation of each section of the image pickup device 1.

In a flash shooting mode, the flash circuit 63 controls the amount of light emission of the flash section 318 or an external flash section, connected to the connection terminal section 319, to the amount of light emission set by the main controlling section 62.

The operating section 64 includes, for example, the mode setting dial 305, the control-value setting dial 306, the shutter button 307, the setting button group 312, the arrow key 314, the pushbutton 315, and the main switch 317. The operating section 64 inputs operation information to the main controlling section 62.

The VRAMs 65a and 65b are buffer memories which are provided between the main controlling section 62 and the LCD 311 and between the main controlling section 62 and the EVF 316, respectively, and which have storage capacities for storing image signals corresponding to the number of pixels of the LCD 311 and the EVF 316. The card I/F 66 is an interface that makes possible signal transmission and reception between the memory card 67 and the main controlling section 62. The memory card 67 is a recording medium that stores image data generated by the main controlling section 62. The communications I/F 68 is an interface for making possible transmission of, for example, the image data to a personal computer or to other external devices.

The power supply circuit 69 is, for example, a constant voltage circuit, and generates a voltage for driving the entire image pickup device 1, such as the controlling sections, that is, the main controlling section 62, etc., the image pickup element 101, and the various driving sections. Further, controlling of application of current to the image pickup element 101 is carried out on the basis of a control signal applied to the power supply circuit 69 from the main controlling section 62. The battery 69B is a primary battery, such as an alkaline dry battery, or a secondary battery, such as a nickel metal hydride rechargeable battery, and is a power supply that supplies electrical power to the entire image pickup device 1.

On the basis of the control signal applied from the main controlling section 62, the shutter driving controlling section 73A generates a driving control signal to the shutter driving actuator 73M. The shutter driving actuator 73M is an actuator that performs a driving operation for opening and closing the shutter unit 40.

On the basis of a control signal applied from the main controlling section 62, the stop driving controlling section 76A generates a driving control signal to the stop driving actuator 76M. The stop driving actuator 76M applies driving power to the stop driving mechanism 27 through the coupler 75.

The camera body 10 also includes a phase difference AF calculating circuit 77 that performs calculations required during autofocus (AF) control using the image pickup element 101, on the basis of image data output from the black level correcting circuit 611 and provided after black level correction.

A phase difference AF operation of the image pickup device 1 using the phase difference AF calculating circuit 77 will be described in detail.

<Phase Difference AF Operation of Image Pickup Device 1>

The image pickup device 1 is formed so that it can perform a phase difference AF by receiving transmission light transmitted (passed) through different portions of the exit pupil in the image pickup element 101. The structure of the image pickup element 101 and the principles of the phase difference AF making use of the image pickup element 101 will be described below.

Figure 5:
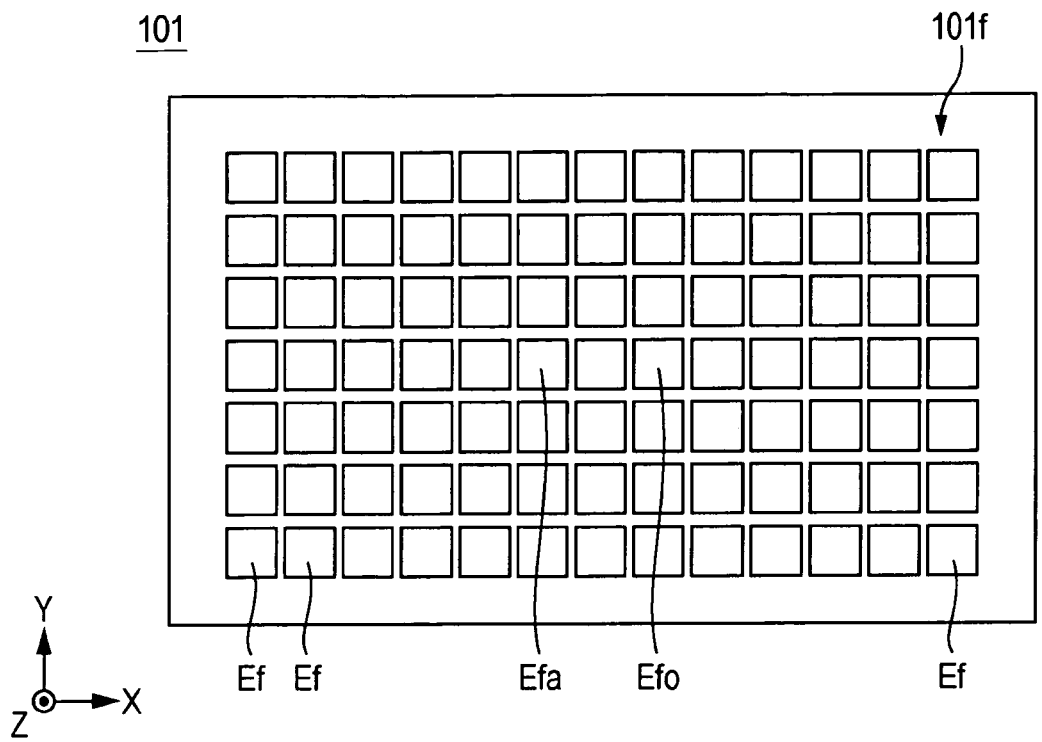
FIG. 5 is a view for illustrating the structure of an image pickup element 101.
Figure 6:
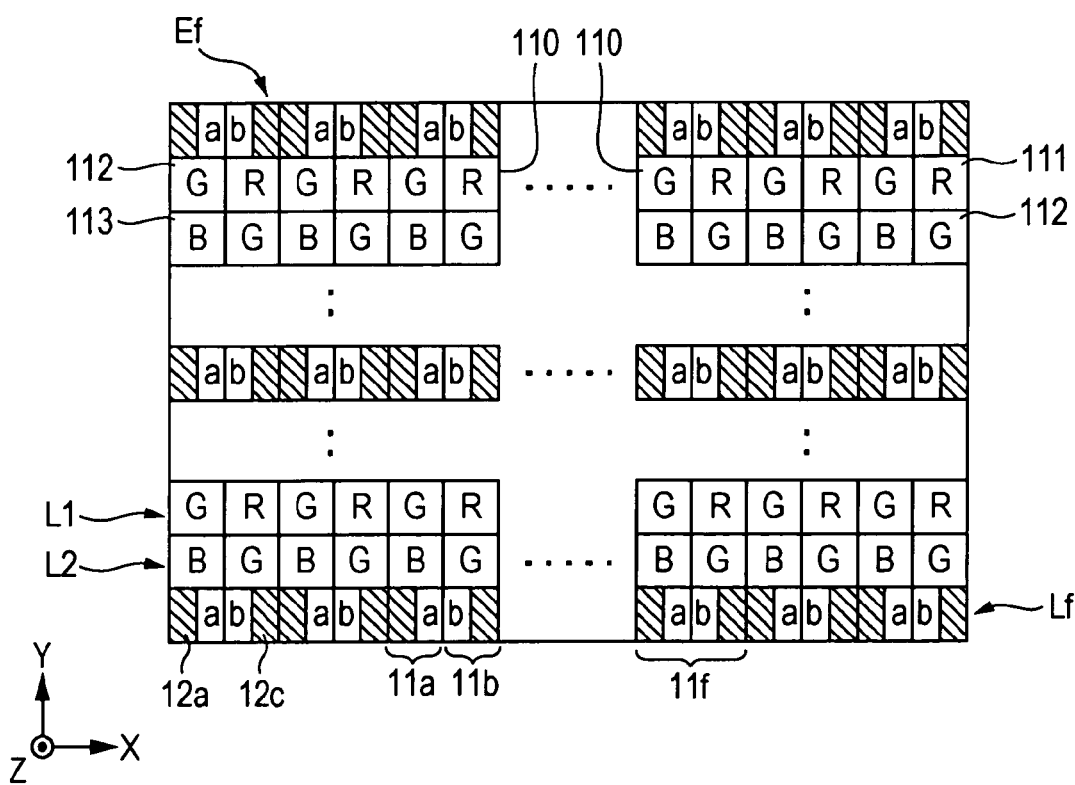
FIG. 6 is a view for illustrating the structure of the image pickup element 101.

FIGS. 5 and 6 each illustrate the structure of the image pickup element 101.

The image pickup element 101 is formed so that it can perform focus detection using the phase difference detection method at each of a plurality of AF areas Ef in a matrix arrangement in an image pickup surface 101f (see FIG. 5).

Each AF area Ef is provided with ordinary pixels (hereunder may also be referred to as "ordinary pixels") 110 including R pixels 111, G pixels 112, and B pixels 113, at which respective color filters, R (red) filters, G (green) filters, and B (blue) filters are disposed on a photodiode; and pixel pairs (hereunder may also be referred to as "AF pixel pairs") including lower light-intercepting masks 12a and 12c (hatched portions; not shown) and used for performing the phase-difference AF (see FIG. 6).

In addition, each AF area Ef is provided with Gr lines L1 and Gb lines L2. The Gr lines L1 and the Gb lines L2 are horizontal lines of the ordinary pixels 110. The Gr lines L1 have the G pixels 112 and the R pixels 111 alternately disposed horizontally. The Gb lines L2 have the B pixels 113 and the G pixels 112 alternately disposed horizontally. By alternately disposing vertically the Gr lines L1 and the Gr lines L2, a Bayer arrangement is formed.

In addition, in the AF areas Ef, AF lines (focus detection pixel rows) Lf, at which AF pixel pairs 11f are repeatedly disposed horizontally, are periodically vertically formed.

Next, the structure of the AF pixel pair 11f will be described.

Figure 7:
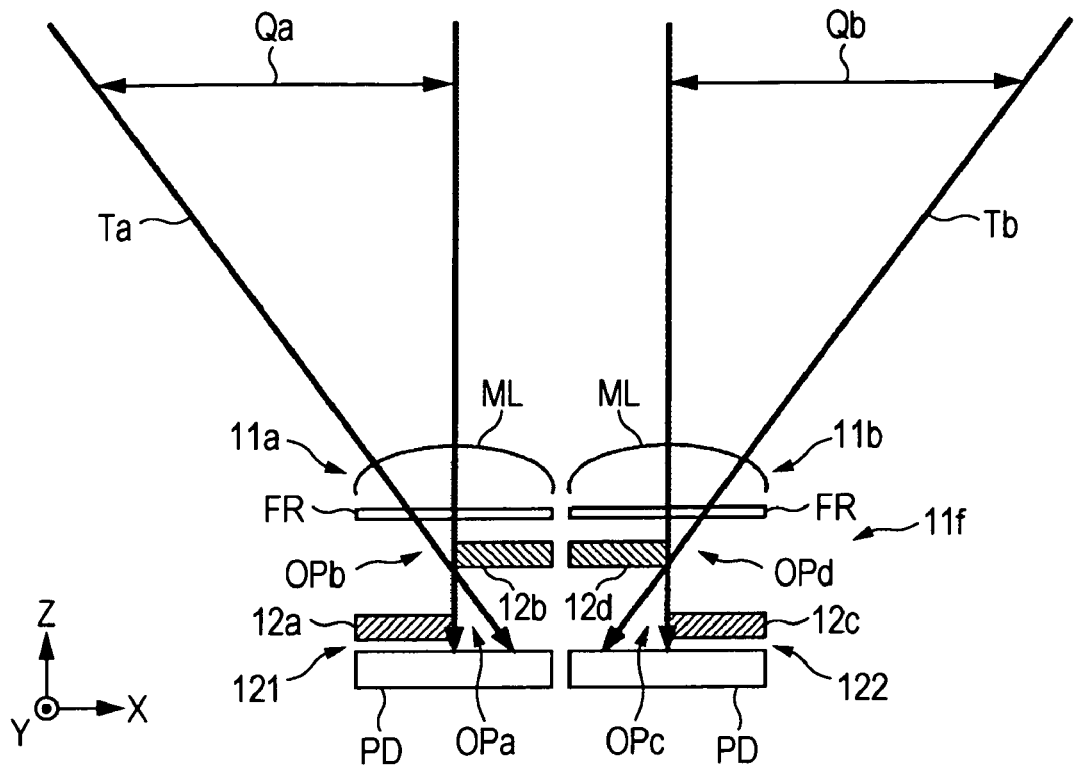
FIG. 7 is a vertical sectional view for illustrating the structures of AF pixel pairs 11f.

FIG. 7 is a vertical sectional view for illustrating the structure of the AF pixel pair 11f. The AF pixel pair 11f shown in FIG. 7 is provided in the AF area Ef (for example, an AF area Efo shown in FIG. 5) positioned close to the center of the image pickup surface 101f.

The AF pixel pair 11f includes a pair of pixels 11a and 11b provided with two light-intercepting masks (light-intercepting plates) 12a and 12b and two light-intercepting masks (light-intercepting plates) 12c and 12d where the positions of openings OPa and OPb and OPc and OPd serve as mirror surfaces. The openings OPa and OPb and OPc and OPd separate a light beam Ta from a left portion Qa of the exit pupil associated with the interchangeable lens 2 and a light beam Tb from a right portion Qb of the exit pupil associated with the interchangeable lens 2. By horizontally disposing two or more AF pixel pairs 11f, AF lines Lf are formed.

More specifically, in the pixel (hereunder may also be referred to as the "first AF pixel") 11a, the rectangular (slit-shaped) opening OPa that is disposed towards the right with respect to a photoelectric converter (photodiode) PD is formed in the lower light-intercepting mask 12a, and the slit-shaped opening OPb that is disposed towards the left with respect to the photoelectric converter (photodiode) PD is provided in the upper light-intercepting mask 12b. In addition, a light-transmitting portion of a light-intercepting portion 121 including the light-intercepting mask 12a and the light-intercepting mask 12b is formed by each of the openings OPa and OPb. In addition, the left portion Qa at the exit pupil is defined by the light-transmitting portion. On the other hand, in the pixel (hereunder may also be referred to as the "second AF pixel") 11b, the slit-shaped opening OPc that is disposed towards the left with respect to a photoelectric converter (photodiode) PD is formed in the lower light-intercepting mask 12c, and the slit-shaped opening OPd that is disposed towards the right with respect to the photoelectric converter (photodiode) PD is provided in the upper light-intercepting mask 12d. A light-transmitting portion of a light-intercepting portion 122 including the light-intercepting mask 12c and the light-intercepting mask 12d is formed by each of the openings Opc and OPd. Further, the right portion Qb at the exit pupil is defined by the light-transmitting portion. The first AF pixels 11a and the second AF pixels 11b are alternately disposed at the AF line Lf as shown in FIG. 6.

By the AF pixel pair 11f having the above-described structure, pupil division at the exit pupil is performed. That is, the light beam Ta from the left portion Qa of the exit pupil passes through a microlens ML, a color filter FR, and the openings (light-transmitting portion) OPa and OPb of the respective light-intercepting masks 12a and 12b and is received by the photoelectric converter PD of the first AF pixel 11a; and the light beam Tb from the right portion Qb of the exit pupil passes through a microlens ML, a color filter FR, and the openings (light-transmitting portion) OPc and OPd of the respective light-intercepting masks 12c and 12d, and is received by the photoelectric converter PD of the second AF pixel 11b. In other words, in the AF pixel pair 11f, the light beams Ta and Tb of an object transmitted through the left portion (first portion area) Qa and the right portion (second portion area) Qb, which are disposed towards the left and right in opposite directions in the exit pupil of the interchangeable lens 2 are received.

Hereunder, reception data obtained at each first AF pixel 11a is called "A-series data," and reception data obtained at each second AF pixel 11b is called "B-series data." The principles of the phase difference AF will be described with reference to, for example, FIGS. 8 to 12 in which the A-series data and the B-series data obtained from a group of the AF pixel pairs 11f disposed in one AF line Lf (see FIG. 6) are illustrated by graphs.

Figure 8:
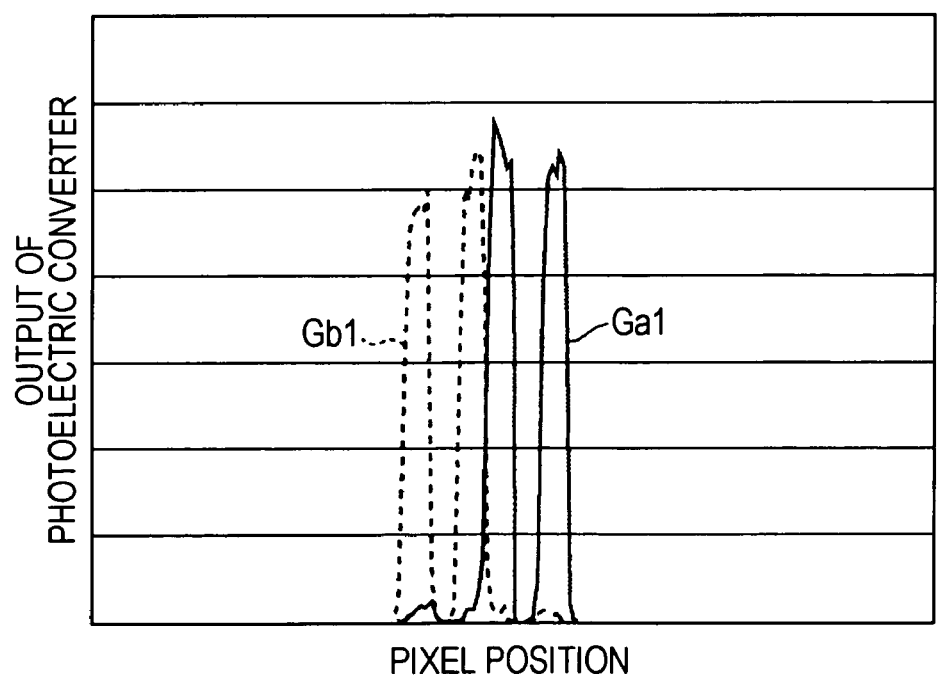
FIG. 8 shows simulation results when a focal plane is defocused to a near side of 200 μm from an image pickup surface of the image pickup element 101.
Figure 9:
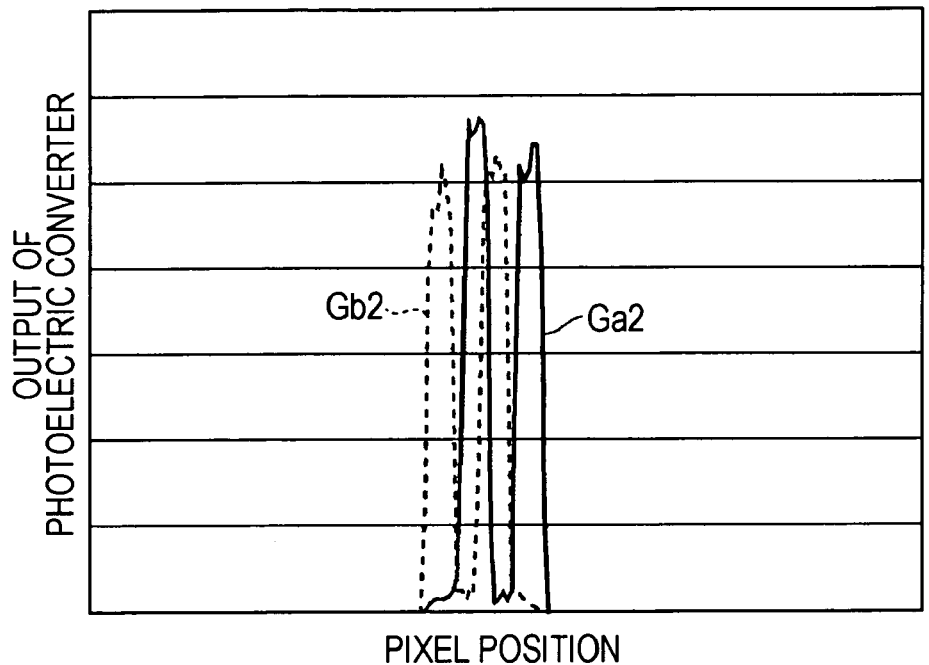
FIG. 9 shows simulation results when the focal plane is defocused to a near side of 100 μm from the image pickup surface.
Figure 10:
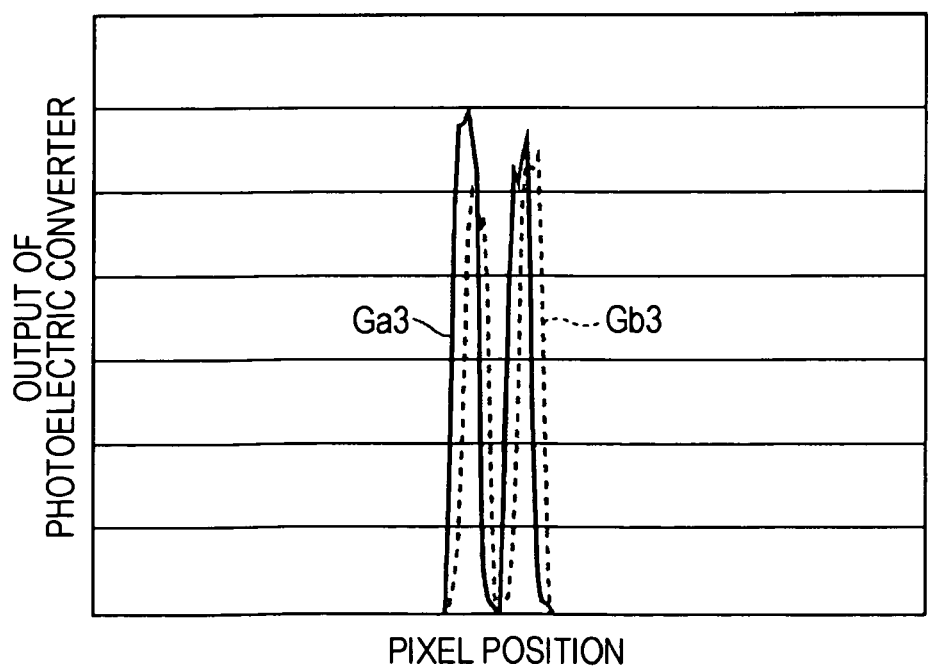
FIG. 10 shows simulation results in a focused state when the focal plane matches the image pickup surface.
Figure 11:
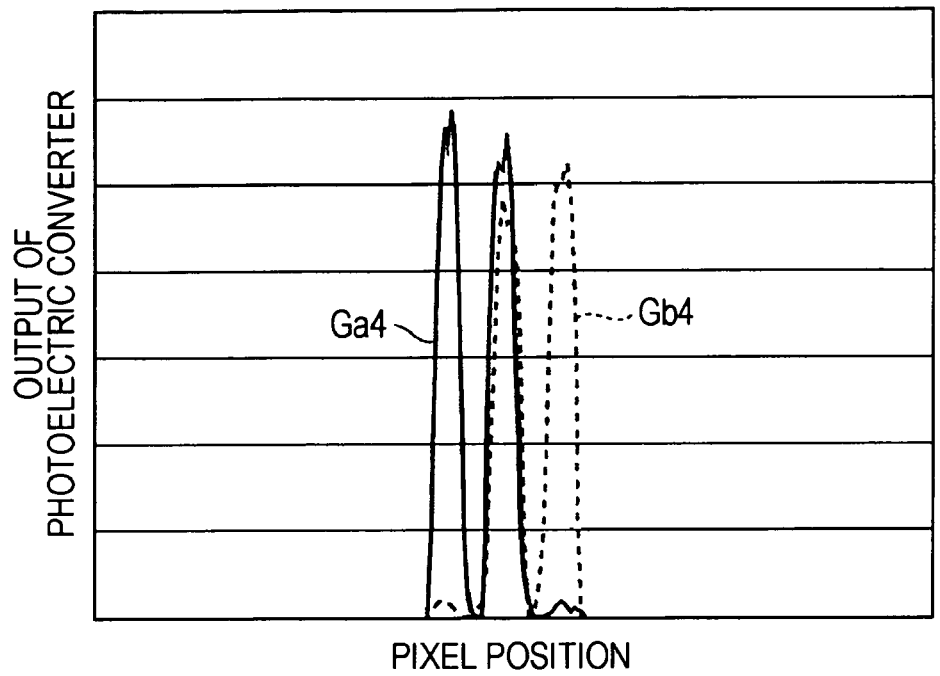
FIG. 11 shows simulation results when the focal plane is defocused to a far side of 100 μm from the image pickup surface.
Figure 12:
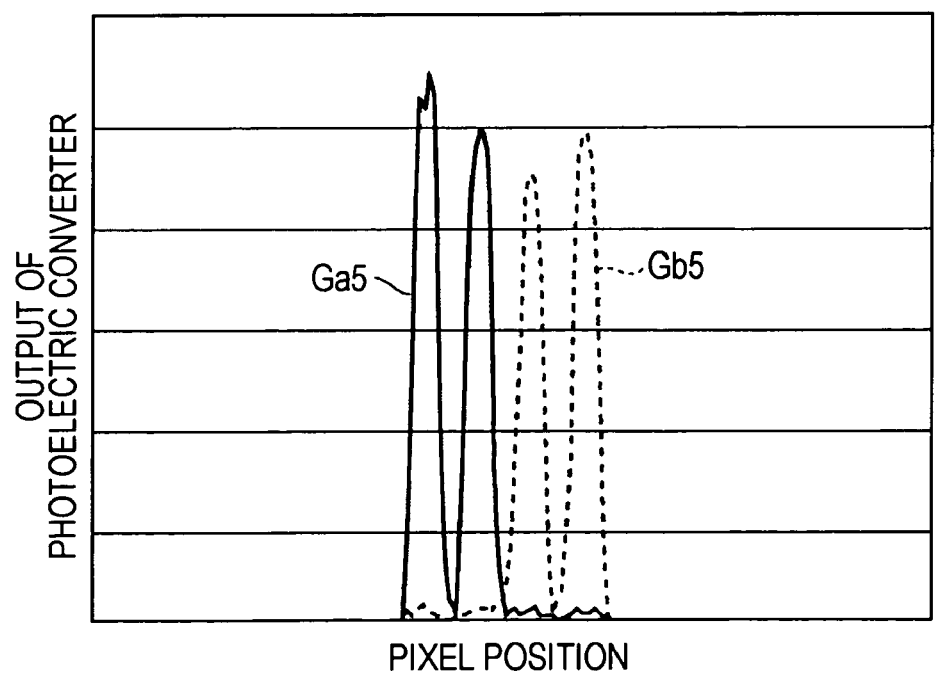
FIG. 12 shows simulation results when the focal plane is defocused to a far side of 200 μm from the image pickup surface.

FIG. 8 shows simulation results when a focal plane is defocused to a near side of 200 μm from the image pickup surface 101f of the image pickup element 101. FIG. 9 shows simulation results when the focal plane is defocused to a near side of 100 μm from the image pickup surface 101f. In addition, FIG. 10 shows simulation results in a focused state when the focal plane matches the image pickup surface 101f. Further, FIG. 11 shows simulation results when the focal plane is defocused to a far side of 100 μm from the image pickup surface 101f. FIG. 12 shows simulation results when the focal plane is defocused to a far side of 200 μm from the image pickup surface 101f. Here, in FIGS. 8 to 12, the horizontal axis represents the positions of the first AF pixels 11a and the second AF pixels 11b in the direction of the AF line Lf, and the vertical axis represents the outputs from the photoelectric converters PD of the respective first AF pixels 11a and second AF pixels lib. In addition, in FIGS. 8 to 12, graphs Ga1 to Ga5 (illustrated by solid lines) represent the A-series data, and graphs Gb1 to Gb5 (illustrated by broken lines) represent the B-series data.

In FIGS. 8 to 12, when image sequences of the A-series data represented by the A-series graphs Ga1 to Ga5 and image sequences of the B-series data represented by the B-series graphs Gb1 to Gb5 are compared with each other, it can be seen that, the larger the defocusing amount, the larger a shift amount (displacement amount) in the direction of the AF line Lf (horizontal direction) occurring between the image sequences of the A-series data and the image sequences of the B-series data.

Figure 13:
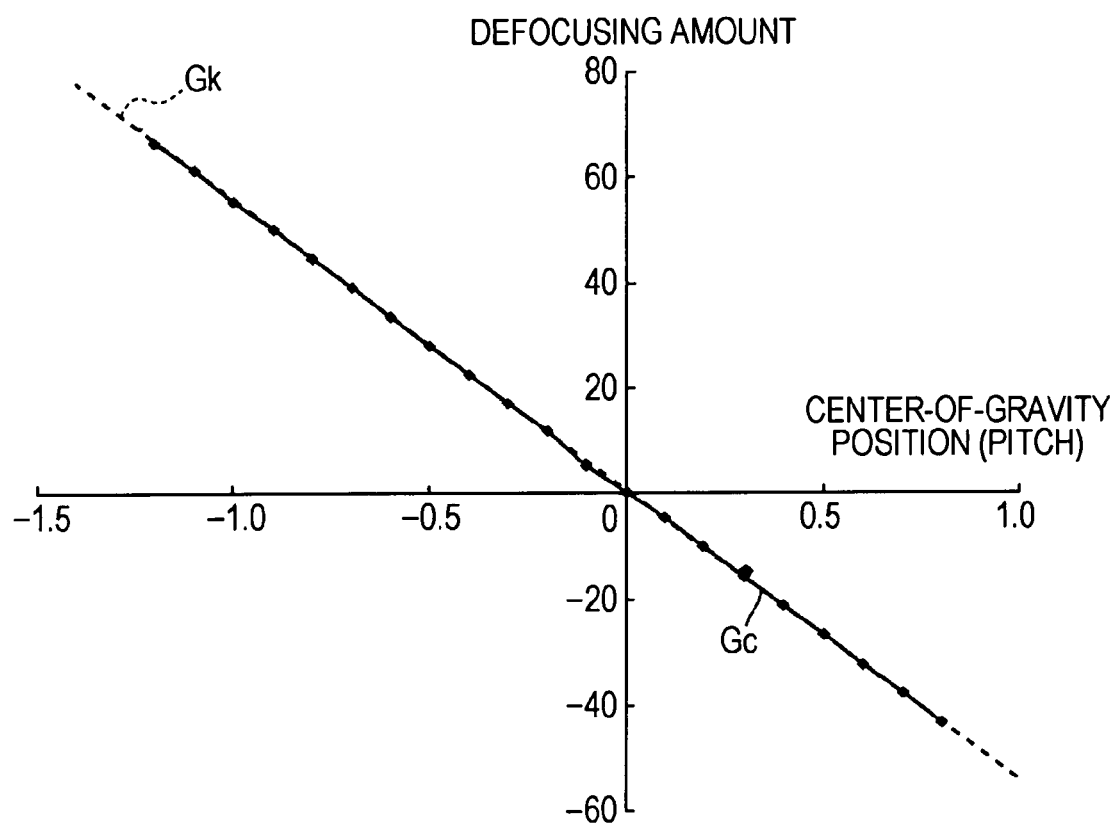
FIG. 13 illustrates a graph Gc showing the relationship between a defocusing amount and a difference between center-of-gravity positions in a pair of image sequences.

The relationship between the defocusing amount and the shift amount in the pairs of image sequences (that is, the image sequences of the A-series data and those of the B-series data) is represented by a graph Gc shown in FIG. 13. In FIG. 13, the horizontal axis represents the difference of a center-of-gravity position of the image sequence of the B-series data from a center-of-gravity position of the image sequence of the A-series data (that is, a pixel pitch), and the vertical axis represents the defocusing amount (μm). Further, a center-of-gravity position $X_g$ of the image sequence is obtained using, for example, the following Formula (1):

[Formula 1]

$$X_g = \frac{X_1 Y_1 + X_2 Y_2 + \ldots + X_n Y_n}{Y_1 + Y_2 + \ldots + Y_n} \quad (1)$$

Here, in the aforementioned Formula (1), $X_1$ to $X_n$ represent, for example, the pixel positions from the left end in an AF line Lf, and $Y_1$ to $Y_n$ represent the output values of the first AF pixels 11a and the second AF pixels 11b.

As shown by the graph Gc shown in FIG. 13, the defocusing amount and the difference between the center-of-gravity positions of the pair of image sequences are proportional to each other. This relationship is represented by the following Formula (2):

[Formula 2]

$$DF = k \times C \quad (2)$$

where the defocusing amount is DF (μm) and the difference between the center-of-gravity positions is C(μm).

Here, the coefficient k in the Formula (2) represents a slope Gk (illustrated by a broken line) of the graph Gc shown in FIG. 13, and can be previously obtained by, for example, a test in a factory.

Accordingly, after the phase difference AF calculating circuit 77 obtains the difference between the center-of-gravity positions (the phase difference) of the A-series data and the B-series data obtained from the AF pixel pairs 11f, it is possible to calculate the defocusing amount using the Formula (2), and to drive the focus lens 211 by a driving amount corresponding to the calculated defocusing amount, to perform autofocus (AF) control in which the focus lens 211 is moved to a detected focus position. Further, the relationship between the defocusing amount and the driving amount of the focus lens 211 is uniquely determined on the basis of a design value of the interchangeable lens 2 mounted to the camera body 10.

In such an image pickup device 1 including the image pickup element (phase-difference detecting image pickup element) 101, distance measurement control that is in accordance with the position of the exit pupil of the interchangeable lens 2 mounted to the camera body 10 is performed to perform the phase difference AF with high precision. The distance measurement control will hereunder be described in detail.

<Distance Measurement Control in Accordance with Position of Exit Pupil of Interchangeable Lens 2>

Figure 14:
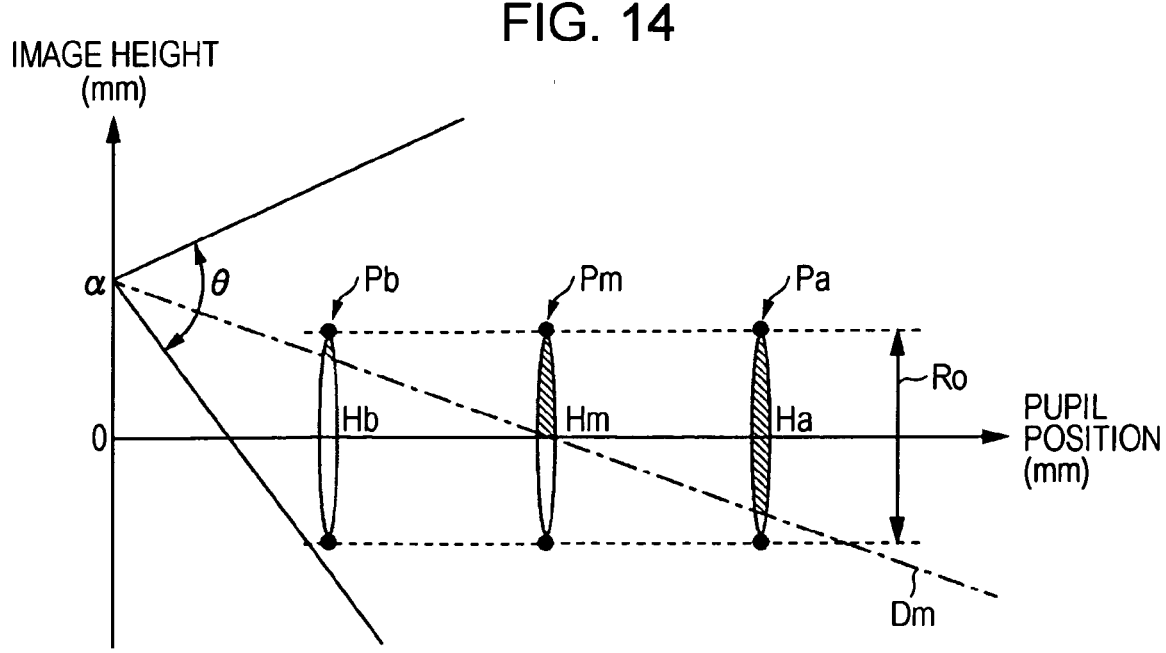
FIG. 14 illustrates an imbalance in pupil divisions occurring in accordance with the position of an exit pupil of an interchangeable lens 2.

FIG. 14 illustrates an imbalance in pupil divisions occurring in accordance with the position of the exit pupil of the interchangeable lens 2. In FIG. 14, the horizontal axis represents the position of the exit pupil with respect to the image pickup surface 101, and the vertical axis represents the distance from the optical axis of the interchangeable lens 2, that is, the center of the image pickup surface 101f (image height). Further, in FIG. 14, a range of an entrance pupil (OCL entrance pupil) of a microlens ML regarding pixels disposed at the position of the image height α [mm] is represented by an angle θ.

In the image pickup element 101, even in an AF pixel pair at the image height α [mm] provided at an AF area Ef (for example, an AF area Efa shown in FIG. 5) situated away from the central portion of the image pickup surface 101f, a suitable pupil division can be performed at a standard exit pupil position Pm situated at a distance Hm (such as approximately 80 to 90 mm) from the image pickup surface 101f. More specifically, as shown in the conceptual view of FIG. 15, for example, in an AF pixel pair 11g in the AF area Efa, the left end of a lower light-intercepting mask 13c in a right pixel 11gb is provided rightwards from a center Co of a photoelectric converter PD by a distance Ea, so that light beams Tc and Td which pass through respective left and right portions Qc and Qd, obtained by equally dividing in two the exit pupil having a pupil diameter Ro and being formed at a distance of Hm from the image pickup surface 101f, can be received by the respective photoelectric converters PD. By this, as shown in FIG. 14, in the AF pixel pair 11g disposed at the position of the image height α [mm], a pupil division line Dm extending obliquely with respect to a perpendicular line to the image pickup surface 101f is set. Therefore, the pupil can be equally divided at the exit pupil situated at the position Pm separated from the image pickup surface 101f by the distance Hm (hereunder also referred to as "intermediate position").

On the other hand, in the interchangeable lens 2, exit pupil positions thereof that are considerably different from the aforementioned position Pm exist. For example, as shown in FIG. 14, in an interchangeable lens in which an exit pupil is formed at a position Pa situated at a relatively large distance Ha from the image pickup surface 101f (hereunder may also be referred to as "far position"), or, in an interchangeable lens in which an exit pupil is formed at a position Pb situated at a relatively small distance Hb from the image pickup surface 101f (hereunder may also be referred to as "near position"), when a uniform exit pupil division is performed by the pupil division line Dm, a difference in the sizes of the respective areas that are divided occur. Here, since A-series and B-series pixel signals cannot be generated in a balanced manner by the AF pixel pairs, distance measurement (focus detection) is not frequently performed with high precision.

Figure 16:
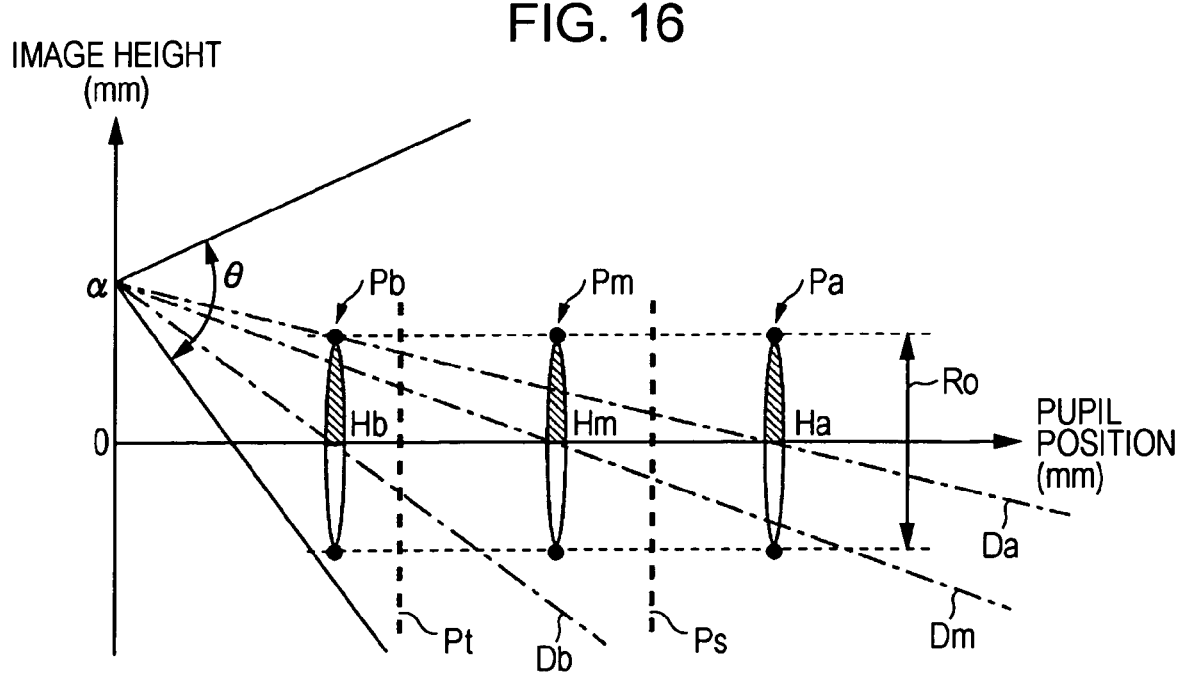
FIG. 16 is a view for illustrating distance measurement control that is in accordance with the position of the exit pupil of the interchangeable lens 2.

Here, in the image pickup device 1 according to the embodiment, as shown in FIG. 16, if the interchangeable lens 2 whose exit pupil is situated at the far position Pa is mounted to the camera body 10, distance measurement is performed using an AF pixel pair 11j at which a pupil division line Da that is in accordance with an exit pupil position of the lens 2 is prescribed. More specifically, as shown in the conceptual view of FIG. 17, in the AF pixel pair 11j, for example, the left end of a lower light-intercepting mask 13c at a right pixel 11jb is set rightwards from a center Co of a photoelectric converter PD by a distance Eb (here, Eb<Ea). A light-transmitting portion in a light-intercepting portion 131 formed of two light-intercepting masks 13a and 13b and a light-transmitting portion in a light-intercepting portion 132 formed of two light-intercepting masks 13c and 13d have structures differing from that of the aforementioned AF pixel pairs 11g. By this, light beams Te and Tf which pass through respective left and right portions Qe and Qf, obtained by equally dividing in two the exit pupil formed at the distance Ha from the image pickup surface 101f, can be received by respective photoelectric converters PD. By this, as shown in FIG. 16, in the AF pixel pair 11j disposed at the position of the image height α [mm], the pupil division line Da whose inclination is more gentle than that of the pupil division line Dm is set. Therefore, the pupil can be equally divided for the exit pupil situated at the far position Pa.

Here, in the image pickup device 1 according to the embodiment, as shown in FIG. 16, if the interchangeable lens 2 whose exit pupil is situated at the near position Pb is mounted to the camera body 10, distance measurement is performed using an AF pixel pair 11k at which a pupil division line Db that is in accordance with an exit pupil position of the lens 2 is specified. More specifically, as shown in the conceptual view of FIG. 18, in the AF pixel pair 11k, for example, the left end of a lower light-intercepting mask 13c in a right pixel 11kb is set rightwards from a center Co of a photoelectric converter PD by a distance Ec (here, Ec>Ea). In addition, the right end of a lower light-intercepting mask 13a at a left pixel 11ka is set rightwards from a center Co of a photoelectric converter PD by a distance Ed. A light-transmitting portion in a light-intercepting portion 131 and a light-transmitting portion in a light-intercepting portion 132 have structures differing from that of the aforementioned AF pixel pair 11g. By this, light beams Tg and Th which pass through respective left and right portions Qg and Qh, obtained by equally dividing in two the exit pupil formed at a distance Hb from the image pickup surface 101f, can be received by respective photoelectric converters PD. By this, as shown in FIG. 16, in the AF pixel pair 11k disposed at the position of the image height α [mm], a pupil division line Db whose inclination is steeper than that of the pupil division line Dm is set. Therefore, the pupil can be equally divided for the exit pupil situated at the near position Pb.

Figure 19:
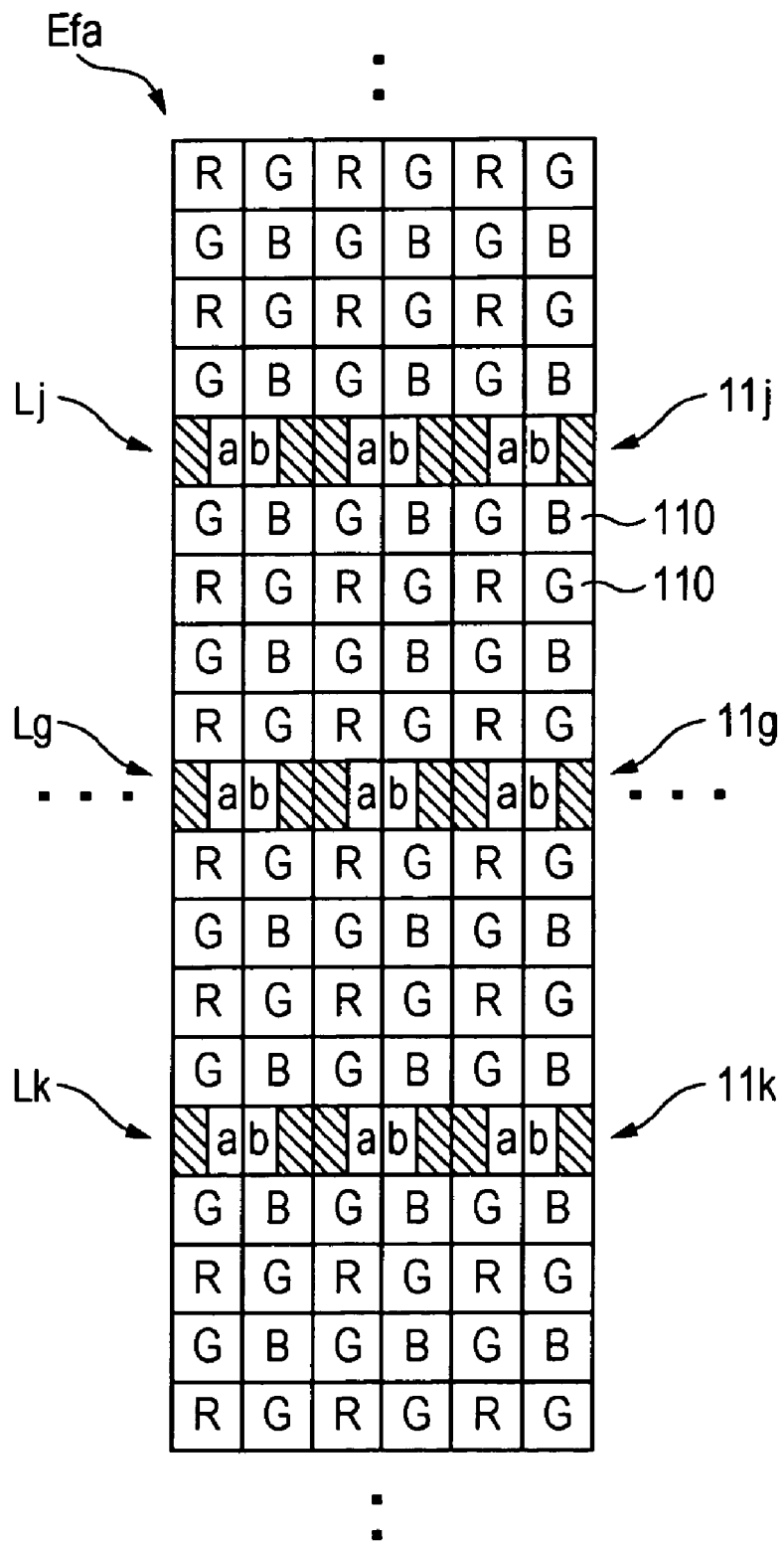
FIG. 19 illustrates each of far pupil, intermediate pupil, and near pupil AF lines Lj, Lg, and Lk.

With regard to each of the AF pixel pairs 11g, 11j, and 11k having the above-described structure, in the AF area Efa (FIG. 5) situated away from the central portion of the image pickup surface 101f, for example, as shown in FIG. 19, a far pupil AF line Lj, an intermediate pupil AF line Lg, and a near pupil AF line Lk are periodically and perpendicularly disposed between four horizontal lines of ordinary pixels 110. In the AF line Lj, AF pixel pairs 11j corresponding to the exit pupil at the far position Pa are horizontally disposed. In the AF line Lg, AF pixel pairs 11g corresponding to the exit pupil at the intermediate position Pm are horizontally disposed. In the AF line Lk, AF pixel pairs 11k corresponding to the exit pupil at the near position Pb are horizontally disposed. Distance measurement control in which each of the AF lines Lg, Lj, and Lk is used in accordance with the position of the exit pupil of the interchangeable lens 2 is performed. More specifically, as shown in FIG. 16, a distance Ps (such as 110 mm) from the image pickup surface 101f and a distance Pt (such as 60 mm) from the image pickup surface 101f are set as threshold values, and, when the interchangeable lens 2 whose exit pupil position becomes greater than or equal to the distance Ps is mounted, the far pupil AF line Lj is selected. In addition, when the interchangeable lens 2 whose exit pupil, position is less than or equal to the distance Pt is mounted, the near pupil AF line Lk is selected, whereas, when the interchangeable lens 2 whose exit pupil position is between the distance Pt and the distance Ps is mounted, the intermediate pupil AF line Lg is selected. Distance measurement is performed using the selected AF line.

That is, the AF lines Lg, Lj, and Lk, provided at the AF area Efa, include three types of pixel pairs 11g, 11j, and 11k having different opposing angles with respect to the exit pupil by varying the dispositions of light-transmitting areas in the light-intercepting portions 131 and 132. In the three types of pixel pairs 11g, 11j, and 11k, the positions Pm, Pa, and Pb (FIG. 16) of the exit pupil with respect to (the image pickup surface 101f) of the image pickup element 101, at which the area of the left portion area associated with the pupil division and the area of the right portion area associated with the pupil division become equal to each other, differ from each other. Therefore, even if the position of the exit pupil changes by replacing the interchangeable lens 2, the AF pixel pair that is in accordance with the position of the exit pupil is selected from the three types of pixel pairs 11g, 11j, and 11k, so that it is possible to perform pupil division in a balanced manner, and to perform focus detection by the phase difference detection method with high precision.

Next, a specific operation of the image pickup device 1 that uses the intermediate pupil AF line Lg, the far pupil AF line Lg, and the near pupil AF line Lk in accordance with the position of the exit pupil will be described.

<Operation of Image Pickup Device 1>

Figure 20:
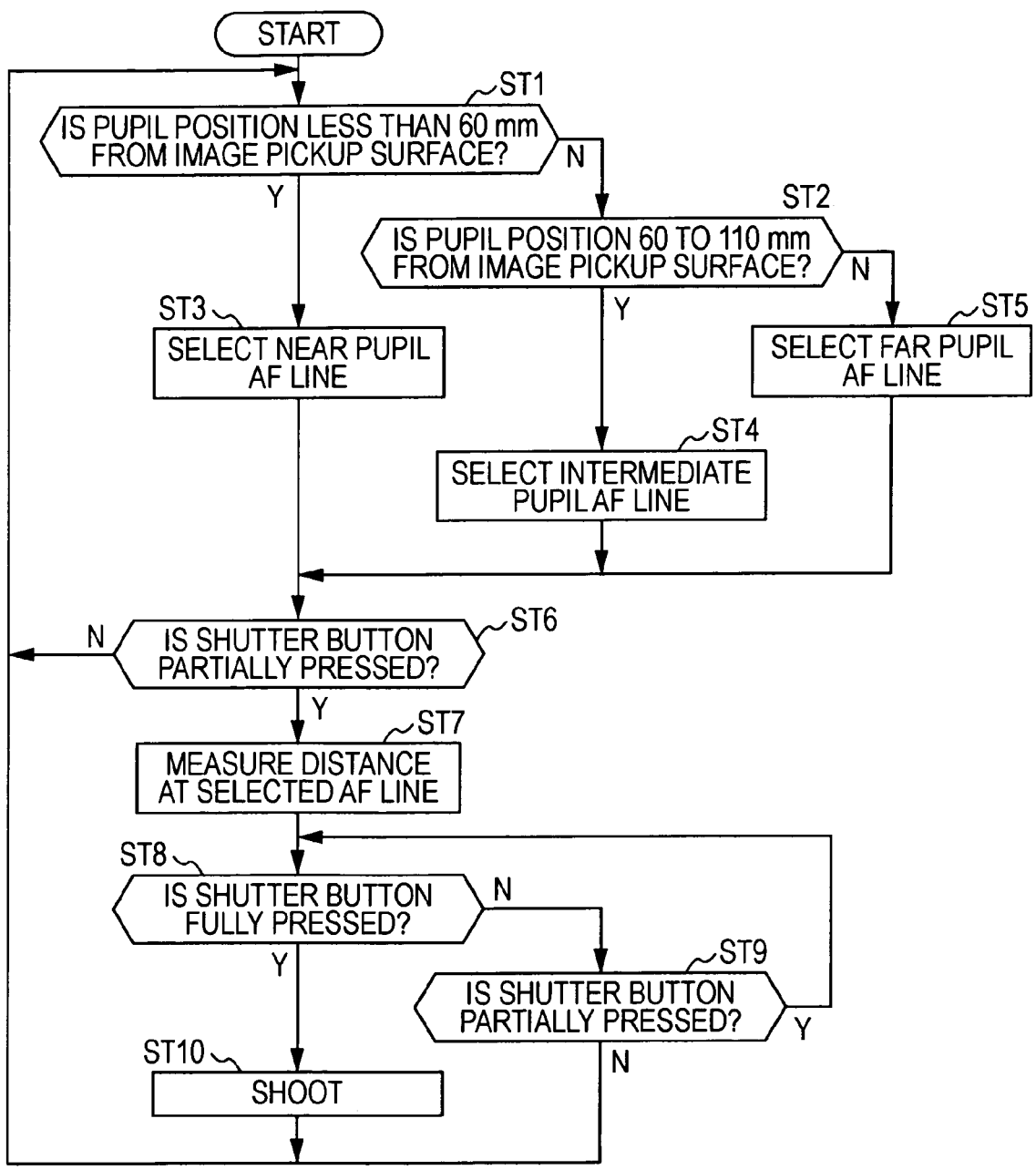
FIG. 20 is a flowchart of a basic operation of the image pickup device 1.

FIG. 20 is a flowchart of a basic operation of the image pickup device 1. The operation of the image pickup device 1 is executed by the main controlling section 62.

When a power supply of the image pickup device 1 is turned on by an operation of the main switch 317 by a user, it is determined whether or not the position of the exit pupil of the interchangeable lens 2 is less than 60 mm from the image pickup surface 101f (Step ST1). More specifically, information regarding the position of the exit pupil of the interchangeable lens 2 stored in ROM in the lens controlling section 26 is obtained by the main controlling section 62 in the camera body 10, to determine whether or not the position of the exit pupil is less than 60 mm. Here, if the position of the exit pupil is less than 60 mm, the process proceeds to Step ST3, whereas, if it is not less than 60 mm, the process proceeds to Step ST2.

In the Step ST2, it is determined whether or not the position of the exit pupil of the interchangeable lens 2 is within 60 to 110 mm from the image pickup surface 101f. Here, if the position of the exit pupil is within 60 to 110 mm, the process proceeds to Step ST4, whereas, if the position of the exit pupil is greater than 110 mm, the process proceeds to Step ST4.

Figure 18:
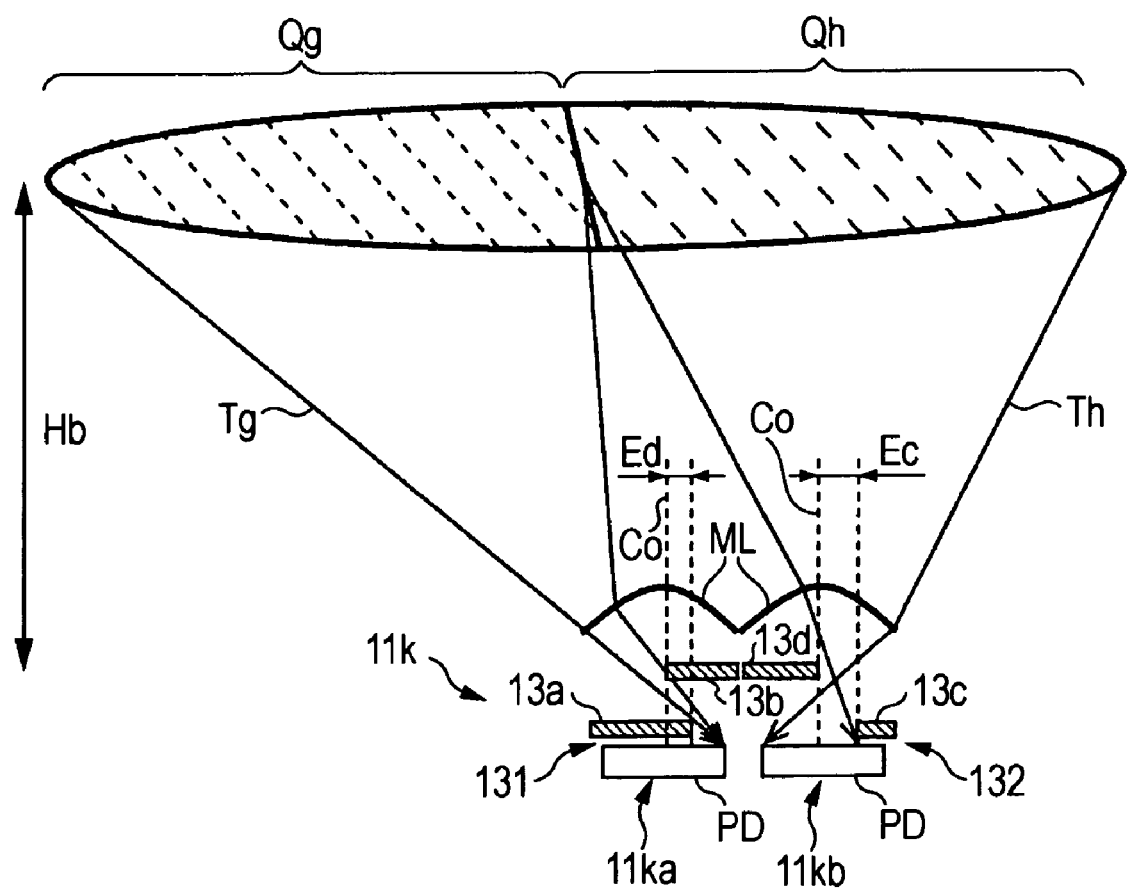
FIG. 18 is a conceptual view for illustrating the structure of an AF pixel pair 11k.

In Step ST3, the near pupil AF line Lk, where the AF pixel pair 11k shown in FIG. 18 is disposed, is selected.

Figure 15:
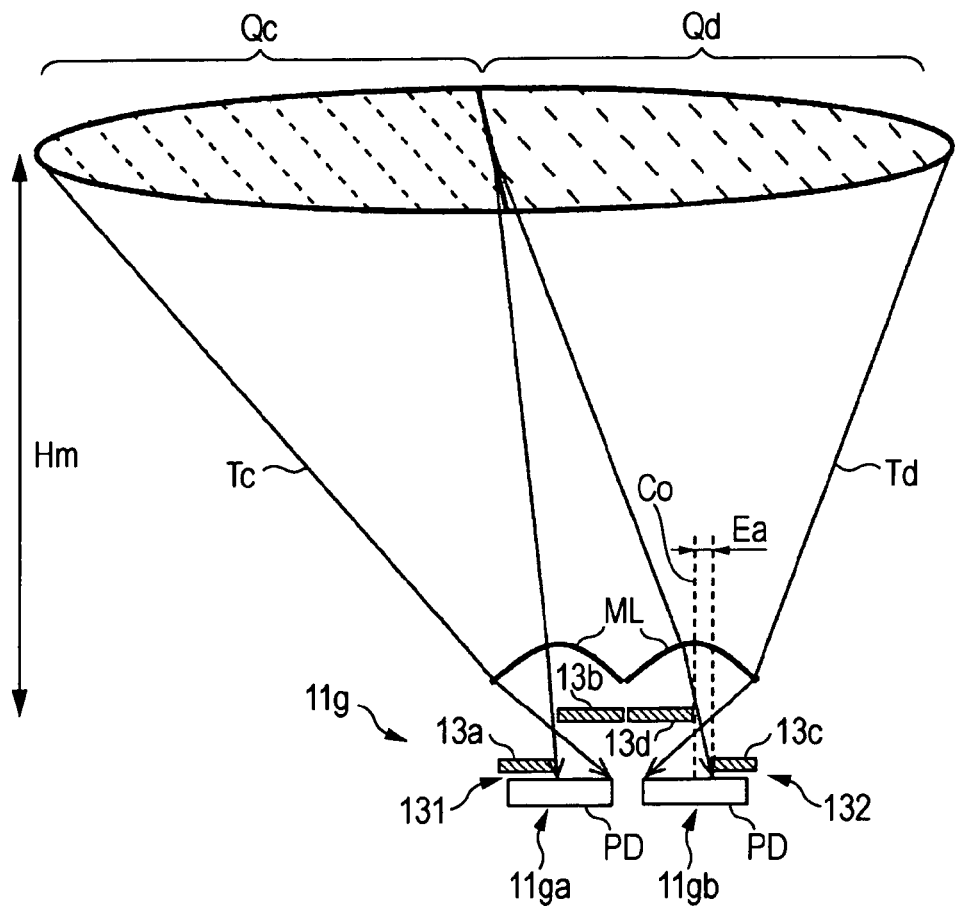
FIG. 15 is a conceptual view for illustrating the structure of an AF pixel pair 11g.

In Step ST4, the intermediate pupil AF line Lm, where the AF pixel pair 11g shown in FIG. 15 is disposed, is selected.

Figure 17:
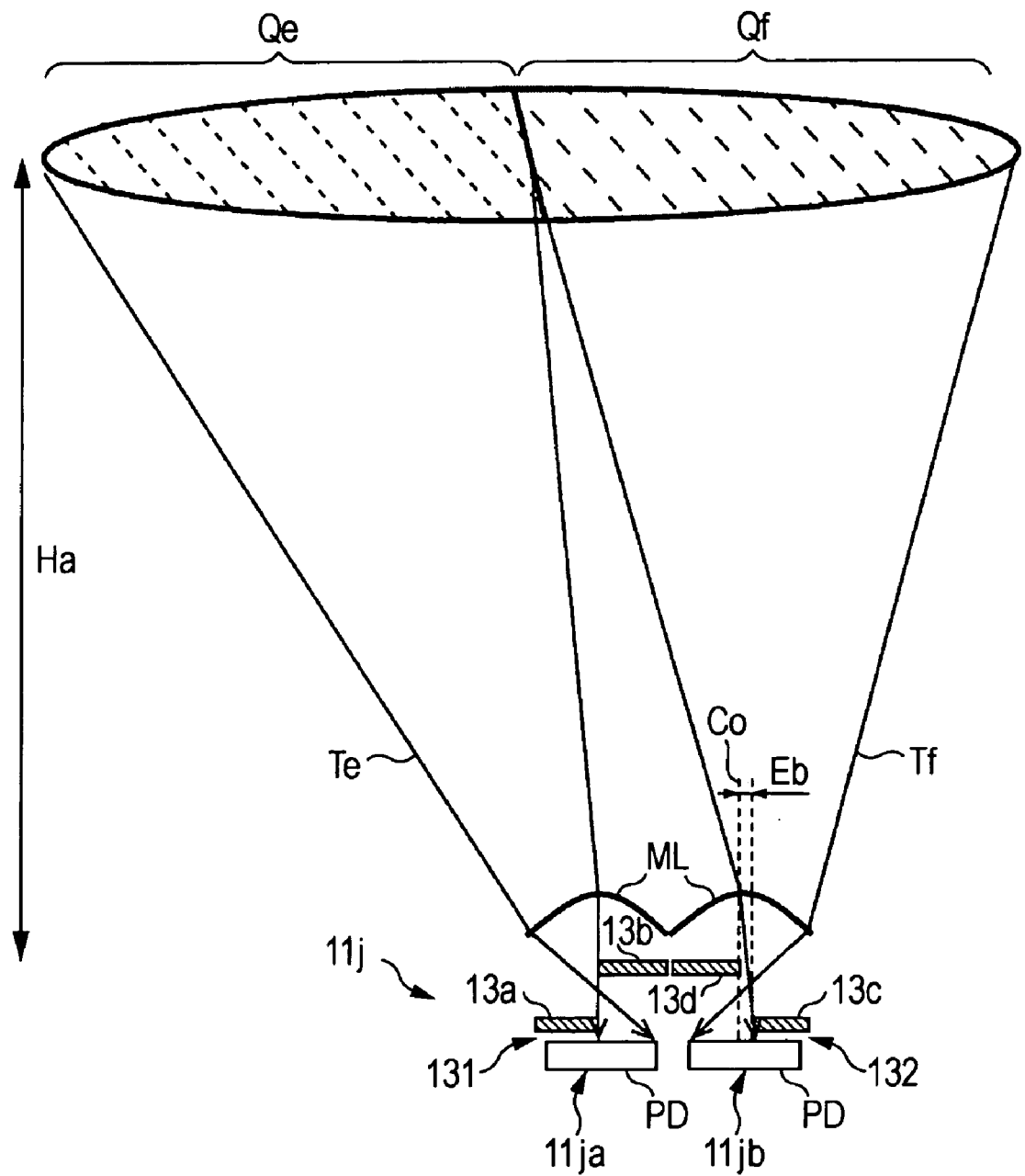
FIG. 17 is a conceptual view for illustrating the structure of an AF pixel pair 11j.

In Step ST5, the far pupil AF line Lj, where the AF pixel pair 11j shown in FIG. 17 is disposed, is selected.

In Step ST6, it is determined whether or not the shutter button 307 has been partially pressed by the user. Here, if the shutter button 307 has been partially pressed, the process proceeds to Step ST7, whereas, if the shutter button 307 has not been partially pressed, the process proceeds to Step ST1.

In Step ST7, distance measurement is performed using the AF line selected in Steps ST3 to ST5. That is, one type of pixel pair is selected from the three types of pixel pairs 11g, 11j, and 11k in accordance with the position of the exit pupil with respect to the image pickup element 101, and focus detection is performed by the phase difference detection method on the basis of a pixel signal generated at the one type of pixel pair. By this, it is possible to perform a good focus detection in accordance with the position of the exit pupil that differs with each interchangeable lens.

In Step ST8, it is determined whether or not the shutter button 307 has been fully pressed by the user. Here, if the shutter button 307 has been fully pressed, the process proceeds to Step ST10, whereas, if the shutter button 307 has not been fully pressed, the process proceeds to Step ST9.

In Step ST9, it is determined whether or not the shutter button 307 is partially pressed by the user. Here, if the shutter button 307 is partially pressed, the process proceeds to Step ST8, whereas, if the shutter button 307 is not partially pressed, the process returns to Step ST1.

In Step ST10, shooting is performed. That is, an actual shooting operation that generates recording shooting image data is performed at the image pickup element 101.

The image pickup device 1 described above is provided with the image pickup element 101 including the AF pixel pairs 11g, 11j, and 11k, which can equally divide in two the exit pupil at the respective positions Pm, Pa, and Pb shown in FIG. 16. Therefore, even if the position of the exit pupil is changed by replacing the interchangeable lens 2, focus detection can be precisely performed by the phase difference detection method.

<Modifications>

Figure 21:
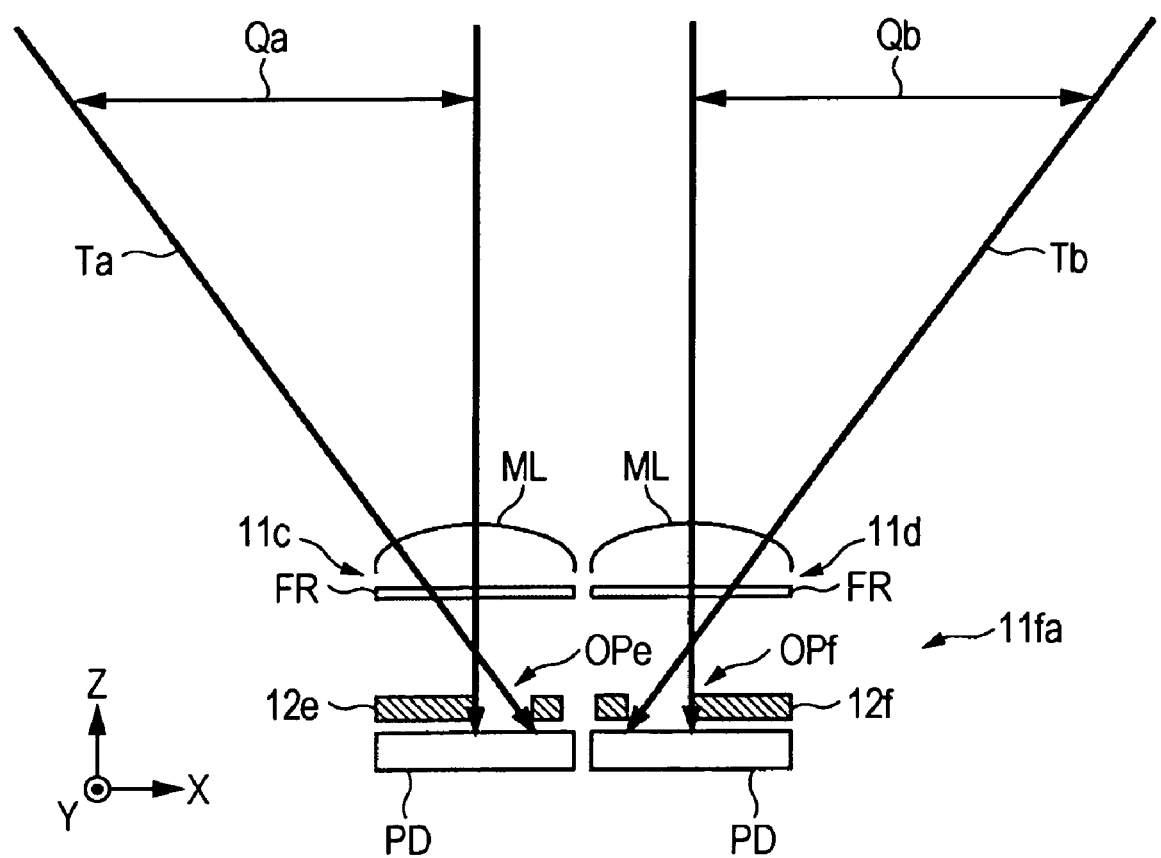
FIG. 21 is a view for illustrating the structure of an AF pixel pair 11fa according to a modification of the present invention.

With regard to the AF pixel pairs in the aforementioned embodiment, it is not necessary that the pixel 11a including the two light-intercepting masks 12a and 12b and the pixel 11b including the two light-intercepting masks 12c and 12d be provided as they are in the AF pixel pair 11f shown in FIG. 7. A pixel 11c including one light-intercepting mask 12e having an opening OPe and a pixel 11d including one light-intercepting mask 12f having an opening OPf may be formed as in an AF pixel pair 11fa shown in FIG. 21.

Accordingly, when even the AF pixel pair 11fa formed of the two pixels 11c and 11d each provided with one light-intercepting mask are disposed in, for example, the AF area Efa (FIG. 5) that is situated away from the vicinity of the center of the image pickup surface 101f, an intermediate pupil AF pixel pair where the pupil division line Dm shown in FIG. 16 is set is provided as in the AF pixel pair 11g (FIG. 15); a far pupil AF pixel pair where the pupil division line Db shown in FIG. 16 is set is provided as in the AF pixel pair 11j (FIG. 17); and a near pupil AF pixel pair where the pupil division line shown in FIG. 16 is set is provided as in the AF pixel pair 11k (FIG. 18). In addition, if the near pupil AF pixel pair, the intermediate pupil AF pixel pair, or the far pupil AF pixel pair is selected in accordance with the position of the exit pupil of the interchangeable lens as described above, focus detection can be performed with high precision.

In the above-described embodiment, the exit pupil need not be divided in two semicircles. The pupil division may be performed so that overlapping occurs at locations that are divided.

In the above-described embodiment, the three types of AF pixel pairs 11g, 11j, and 11k need not be used in accordance with interchangeable lenses. They may be used in accordance with a zoom state of a zoom lens. That is, the intermediate pupil AF pixel pair 11g, the far pupil AF pixel pair 11j, and the near pupil AF pixel pair 11k may be used in accordance with the position of the exit pupil that changes with a zoom magnification of the interchangeable lens 2.

The above-described image pickup element need not include the three types of AF pixel pairs (intermediate pupil AF pixel pair, far pupil AF pixel pair, and near pupil pixel pair). It may include two types or four or more types of AF pixel pairs.

The invention claimed is:

1. An image pickup device, comprising:
   (a) a shooting optical system that accepts a plurality of interchangeable lenses associated with a plurality of different positions of an exit pupil of the shooting optical system; and
   (b) an image pickup element that receives an object light beam transmitted through the shooting optical system,
   wherein the image pickup element includes a group of pixel pairs, each of the pixel pairs receiving the object light beam transmitted through a corresponding first portion area and a corresponding second portion area inclined in opposite directions in the exit pupil of the shooting optical system,
   each of the pixel pairs includes respective first and second pixels, the first pixel of the pixel pair including a first light-intercepting portion whereby a first light-transmitting portion defining the corresponding first portion area in the exit pupil is provided, the second pixel of the pixel pair including a second light-intercepting portion whereby a second light-transmitting portion defining the corresponding second portion area in the exit pupil is provided, and
   the group of pixel pairs includes a plurality of types of pixel pairs in which the first and second light-transmitting portions of a given pixel pair differ from the first and second light-transmitting of other pixel pairs portions, the plurality of types of pixel pairs corresponding to a plurality of different positions of the exit pupil with respect to a position of the image pickup element such that the exit pupil position corresponding to a specific pixel pair is one where the area of the corresponding first portion area and the area of the corresponding second portion area become equal to each other.

2. The image pickup device according to claim 1, further comprising (c) means for performing focus detection by a phase-difference detection method based on a detected pixel signal, generated by one of the pixel pair types, by selecting, from among the plurality of types of pixel pairs, the one of the pixel pair types that corresponds to the position of the exit pupil associated with a specific one of the plurality of interchangeable lenses.

3. An image pickup element capable of receiving an object light beam transmitted through a shooting optical system that accepts a plurality of interchangeable lenses associated with a plurality of different positions of an exit pupil of the shooting optical system, the image pickup element comprising:
   a group of pixel pairs, each of the pixel pairs receiving the object light beam transmitted through a corresponding first portion area and a corresponding second portion area inclined in opposite directions in the exit pupil of the shooting optical system,
   wherein each of the pixel pairs includes respective first and second pixels, the first pixel of the pixel pair including a first light-intercepting portion whereby a first light-transmitting portion defining the corresponding first portion area in the exit pupil is provided, the second pixel of the pixel pair including a second light-intercepting portion whereby a second light-transmitting portion defining the corresponding second portion area in the exit pupil is provided, and
   the group of pixel pairs includes a plurality of types of pixel pairs in which the first and second light-transmitting portions of a given pixel pair differ from the first and second light-transmitting of other pixel pairs portions, the plurality of types of pixel pairs corresponding to a plurality of different positions of the exit pupil with respect to a position of the image pickup element such that the exit pupil position corresponding to a specific pixel pair is one where the area of the corresponding first portion area and the area of the corresponding second portion area become equal to each other.

* * * * *